(12) United States Patent
Langley

(10) Patent No.: US 12,326,961 B2
(45) Date of Patent: *Jun. 10, 2025

(54) INDIVIDUAL DATA UNIT AND METHODS AND SYSTEMS FOR ENHANCING THE SECURITY OF USER DATA

(71) Applicant: Richard Jay Langley, Woburn, MA (US)

(72) Inventor: Richard Jay Langley, Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,407

(22) Filed: Nov. 17, 2023

(65) Prior Publication Data

US 2024/0086572 A1 Mar. 14, 2024

Related U.S. Application Data

(60) Continuation of application No. 18/078,944, filed on Dec. 10, 2022, now Pat. No. 11,861,042, which is a
(Continued)

(51) Int. Cl.
*H04L 29/06* (2006.01)
*G06F 11/14* (2006.01)
(Continued)

(52) U.S. Cl.
CPC ...... *G06F 21/6245* (2013.01); *G06F 11/1464* (2013.01); *G06F 11/1469* (2013.01);
(Continued)

(58) Field of Classification Search
CPC ............ G06F 21/6245; G06F 11/1469; G06F 11/1464; G06F 21/602; G06F 2201/805; H04L 63/10; H04L 9/0894; H04L 63/1441
See application file for complete search history.

(56) References Cited

U.S. PATENT DOCUMENTS 5,933,498 A 8/1999 Schneck et al.
6,148,342 A 11/2000 Ho
(Continued)

FOREIGN PATENT DOCUMENTS

WO WO 2003/032133 A2 4/2003

*Primary Examiner* — Lisa C Lewis
(74) *Attorney, Agent, or Firm* — The Law Office of Kevin McDermott, P.L.L.C.

(57) ABSTRACT

An individual data unit for enhancing the security of a user data record is provided that includes a processor and a memory configured to store data. The individual data unit is associated with a network and the memory is in communication with the processor. The memory has instructions stored thereon which, when read and executed by the processor cause the individual data unit to perform basic operations only. The basic operations include communicating securely with computing devices, computer systems, and a central user data server. Moreover, the basic operations include receiving a user data record, storing the user data record, retrieving the user data record, and transmitting the user data record. The individual data unit can be located in a geographic location associated with the user which can be different than the geographic locations of the computer systems and the central user data server.

5 Claims, 11 Drawing Sheets

Related U.S. Application Data division of application No. 17/156,530, filed on Jan. 23, 2021, now Pat. No. 11,550,950, which is a continuation of application No. 16/686,101, filed on Nov. 16, 2019, now Pat. No. 10,949,566, which is a continuation of application No. 16/408,493, filed on May 10, 2019, now Pat. No. 10,572,683.

(60) Provisional application No. 62/686,041, filed on Jun. 17, 2018, provisional application No. 62/670,831, filed on May 13, 2018.

(51) Int. Cl.
  *G06F 21/00* (2013.01)
  *G06F 21/60* (2013.01)
  *G06F 21/62* (2013.01)
  *H04L 9/08* (2006.01)
  *H04L 9/40* (2022.01)

(52) U.S. Cl.
  CPC .......... *G06F 21/602* (2013.01); *H04L 9/0894* (2013.01); *H04L 63/10* (2013.01); *H04L 63/1441* (2013.01); *G06F 2201/805* (2013.01)

(56) References Cited

U.S. PATENT DOCUMENTS

| | | | |
|---|---|---|---|
| 6,314,409 B2 | 11/2001 | Schneck et al. | |
| 7,805,377 B2 | 9/2010 | Felsher | |
| 7,831,801 B1 | 11/2010 | Anderson | |
| 7,857,368 B2 | 12/2010 | Duke | |
| 7,958,268 B2 | 6/2011 | Redlich et al. | |
| 8,009,830 B2 | 8/2011 | Orsini et al. | |
| 8,112,634 B2* | 2/2012 | Aciicmez | H04L 9/0872 |
| | | | 713/192 |
| 8,151,073 B2 | 4/2012 | Chouery | |
| 8,528,062 B1 | 9/2013 | Connor | |
| 8,659,908 B2 | 2/2014 | Adams et al. | |
| 8,689,287 B2 | 4/2014 | Bohmer et al. | |
| 8,769,269 B2 | 7/2014 | Anglin et al. | |
| 8,793,510 B2 | 7/2014 | Koifman et al. | |
| 8,826,019 B2 | 9/2014 | Shablygin et al. | |
| 8,909,942 B1 | 12/2014 | Obukhov | |
| 9,015,301 B2 | 4/2015 | Redlich et al. | |
| 9,131,462 B1 | 9/2015 | Verghese et al. | |
| 9,245,148 B2* | 1/2016 | Runkis | G06F 21/6218 |
| 9,311,499 B2 | 4/2016 | Redlich et al. | |
| 9,483,656 B2 | 11/2016 | Leggette et al. | |
| 9,594,580 B2 | 3/2017 | Runkis et al. | |
| 9,921,561 B2 | 3/2018 | Schoenberger et al. | |
| 9,954,580 B2 | 4/2018 | Krishna et al. | |
| 10,042,589 B2 | 8/2018 | Schoenberger et al. | |
| 2001/0027467 A1* | 10/2001 | Anderson | G06F 16/27 |
| | | | 709/224 |
| 2003/0120723 A1 | 6/2003 | Bright et al. | |
| 2003/0208686 A1 | 11/2003 | Thummalapally et al. | |
| 2005/0138110 A1 | 6/2005 | Redlich et al. | |
| 2005/0182926 A1 | 8/2005 | Akashika et al. | |
| 2006/0020550 A1 | 1/2006 | Fields et al. | |
| 2006/0087813 A1 | 4/2006 | Becker et al. | |
| 2009/0178144 A1 | 7/2009 | Redlich et al. | |
| 2010/0199089 A1 | 8/2010 | Vysogorets et al. | |
| 2011/0202755 A1 | 8/2011 | Orsini et al. | |
| 2012/0124372 A1 | 5/2012 | Dilley et al. | |
| 2014/0208409 A1 | 7/2014 | Maidl et al. | |
| 2014/0304503 A1 | 10/2014 | O'Hare et al. | |
| 2014/0310516 A1 | 10/2014 | O'Hare et al. | |
| 2015/0180839 A1 | 6/2015 | Moffat | |
| 2016/0042176 A1* | 2/2016 | Riahi | G08B 5/36 |
| | | | 340/691.6 |
| 2016/0092696 A1 | 3/2016 | Guglani et al. | |
| 2016/0267738 A1 | 9/2016 | Carstens et al. | |
| 2017/0046530 A1 | 2/2017 | Raj | |
| 2017/0083713 A1 | 3/2017 | Simmons et al. | |
| 2017/0156057 A1 | 6/2017 | Abdirashid et al. | |
| 2017/0228682 A1 | 8/2017 | Nilsson et al. | |
| 2017/0285974 A1 | 10/2017 | Patock, Sr. | |
| 2018/0115631 A1 | 4/2018 | Martin et al. | |
| 2018/0151013 A1 | 5/2018 | Carstens et al. | |
| 2018/0302400 A1 | 10/2018 | Covdy et al. | |

\* cited by examiner

| compromised components | | | | | data record 72 compromised? | What attacker is missing that prevents compromise of user data 72. | notes |
|---|---|---|---|---|---|---|---|
| device 18 | IDU 22-2 | POS 16 | central user data server 12 | IDU 22-1 | | | |
| X | X |  |  |  | NO | from data server 12, encrypted decryption key 40E for user data 72 | hard to compromise IDU 22-2 w/o logical address and access code from POS 16 |
| X |  | X |  |  | NO | from data server 12, encrypted decryption key 40E for user data 72 | compromises logical address 56 and access code 58 for IDUs 22-1 and 22-2 |
| X |  |  | X |  | NO | from IDU 22-2, decryption keys 36 and 38 for logical address 56 and access code 58 of IDU 22-1 |  |
| X |  |  |  | X | NO | from data server 12, encrypted decryption key 40E for user data 72 | hard to compromise IDU 22-2 w/o logical address 56 and access 58 code from POS 16 |
|  | X | X |  |  | NO | from data server 12, encrypted decryption key 40E for user data; from device 18, decryption key 82 for user data, and logical address and access code for IDU 22-1 |  |
|  | X |  | X |  | NO | everything on user device 18 |  |
|  | X |  |  | X | NO | from data server 12, encrypted decryption key 40E for user data; from device 18, decryption key 82 for decryption key for user data |  |
|  |  | X | X |  | NO | everything on user device 18; everything on IDUs 22-1 & 22-2 |  |
|  |  | X |  | X | NO | from data server 12, encrypted decryption key 40E for user data; from device 18, decryption key 82; for decryption key for user data |  |
|  |  |  | X | X | NO | from device 18, decryption key 82 for decryption key for user data | hard to compromise IDU 22-2 w/o logical address 56 and access code 58 from POS 16 |

FIG. 4

INDIVIDUAL DATA UNIT AND METHODS AND SYSTEMS FOR ENHANCING THE SECURITY OF USER DATA

CROSS REFERENCE TO RELATED APPLICATIONS

This is a continuation application of U.S. patent application Ser. No. 18/078,944, filed Dec. 10, 2022, which is a divisional application of U.S. patent application Ser. No. 17/156,530, filed Jan. 23, 2021, now U.S. Pat. No. 11,550,950, issued Jan. 10, 2023, which is a continuation application of U.S. patent application Ser. No. 16/686,101, filed Nov. 16, 2019, now U.S. Pat. No. 10,949,566, issued Mar. 16, 2021, which is a continuation application of U.S. patent application Ser. No. 16/408,493, filed May 10, 2019, now U.S. Pat. No. 10,572,683, issued Feb. 25, 2020, which claims the benefit of the priority of U.S. Provisional Patent Application Nos. 62/670,831 and 62/686,041, filed May 13, 2018 and Jun. 17, 2018, respectively, the entire disclosures of which are incorporated herein by reference.

BACKGROUND OF THE INVENTION

This invention relates generally to enhancing the security of user data stored in computer systems, and more particularly, to an individual data unit and systems including individual data units such that the security of user data stored in such systems is enhanced.

Different types of entities collect information regarding their customers as part of conducting business or interacting with the public. Such entities may include retailers, governmental agencies, medical providers, identity management system (IDMS) owners and operators, and secure email service providers. Each different entity typically stores its collected user data on a central user data server configured to communicate over networks like the Internet. For example, retailers have been known to store credit card information and order histories for customers. Governmental agencies have been known to store the social security numbers and birth dates of citizens. Medical providers routinely store sensitive health records of individuals. IDMS operators typically store passwords, biometric data, security questions and answers, and other personal information of people who authenticate themselves using the IDMS. Additionally, email systems, including those that are designed to be extra secure against cyber-attack, typically store sensitive emails associated with users in a central user data server.

Some entities have been known to store information regarding many millions of different users. Such large amounts of user data coupled with Internet access to the central user data servers has been known to create a target highly valued by cyber-criminals due to the amount of data that may be stolen in a single successful cyber-attack.

The high value of centralized targets has been known to attract well financed players, including state actors and organized criminal enterprises. The high value of the data, all stored in one place, means that cyber-criminals can afford to mount a well-resourced attack to steal the data, including, in some cases, brute force decryption attacks should the data be stored in an encrypted form.

Cyber-criminals have been known to use stolen customer data for their economic gain. For example, cyber-criminals have been known to use a victim's data to fraudulently open new credit card accounts and to charge purchases to the new accounts. Although the victims likely do not know about the fraudulently opened new accounts or the purchases, many times the victims are liable for purchases made by the cyber-criminals. Even in situations where individual users are not financially liable for such criminal acts, the financial burden of such thefts is spread across all of society and everyone ultimately suffers some financial impact. Cyber-criminals have also been known to take over investment accounts and withdraw the funds from those accounts leaving the victims with little money for retirement or to pay college tuition for children. Additionally, cyber-criminals have been known to use a victims' data to set up new fraudulent social networking sites in which they pretend to be the victim. In addition to financially damaging victims, cyber-attacks have been known to take an emotional toll on victims, cause physical symptoms like inability to concentrate, and create social stress. People whose data is stolen are victims of a successful cyber-attack.

To improve security against cyber-attacks, entities have been known to encrypt the data. The limiting factor for this technique is the fact that the central user data server must have access to the decryption key or keys, which means that any successful cyber-attack on the central user data server may also provide a cyber-criminal with access to the decryption key or keys. Another technique to improve security is to limit direct access to the central user data server via firewalls or other methods. Unfortunately, cyber-criminals have demonstrated the ability to bypass such limitations, either by exploiting security flaws in the firewall devices or by obtaining administrative passwords via sophisticated phishing attacks.

Additional security measures known to have been taken by some entities include encrypting and protecting the decryption key or keys with a password. While this undoubtably makes it more difficult for a cyber-criminal, the same limitation applies: the key to decrypt the decryption key for the user data still has to be accessible to the central user data server, and is thus vulnerable when a cyber-criminal successfully compromises the central user data server.

Another security measure that has been suggested is to distribute the user data across multiple servers. This is typically done in a manner similar to the way RAID storage units "stripe" data across multiple disks. That is, each user's data may be spread across multiple distributed storage locations, all of which need to be accessed and the data combined in order to read that data. Current descriptions of this approach suffer from the same limiting factor as the many schemes for encrypting the user data—the central data server must know where the data has been distributed in order to access it, and this knowledge becomes accessible to a cyber-criminal when the central server is compromised. Forcing a cyber-criminal to serially trace down multiple pieces of information in order to compromise the user data is only an incremental increase in security. It is not orders of magnitude more difficult to access the user data once the central data server has been compromised and the large quantity of valuable data that will be exposed by defeating a handful of additional incremental security measures still makes the target very worthwhile for such cyber-criminals.

Known security measures are typically designed to enhance the difficulty of breaking into central user data servers. Regularly occurring successful cyber-attacks are evidence that known security measures are not effective enough at protecting high value targets containing large volumes of sensitive data stored in a central user data server. That is, the cost to a cyber-criminal is still less than the value of the data obtained in a successful attack. As a result, such known measures do not sufficiently reduce incentives that make it worth-while for cyber-criminals to try to steal large volumes of sensitive data stored in a central user data server.

BRIEF DESCRIPTION OF THE INVENTION

No known security measures enhance security against cyber-attacks by reducing the value of the target. As a result, in one aspect, an individual data unit for enhancing the security of a user data record is provided that supports logical or physical distribution of user data, thereby reducing the attractiveness inherent in a centralized target while simultaneously improving the security of the data of each individual user. Such an individual data unit also helps solve the problem of a central data server having too much knowledge of where user data is stored and how to decrypt that data by enabling new locations to "hide" such information by requiring that more components within a computer system need to be accessed to see that information.

An individual data unit for enhancing the security of a user data record is provided that includes a processor and a memory configured to store data. The individual data unit is associated with a network and the memory is in communication with the processor. The memory has instructions stored thereon which, when read and executed by the processor cause the individual data unit to perform basic operations only. The basic operations include communicating securely with computing devices, computer systems, and a central user data server. Moreover, the basic operations include receiving a user data record, storing the user data record, retrieving the user data record, and transmitting the user data record. The individual data unit can be located in a geographic location associated with the user which can be different than the geographic locations of the computer systems and the central user data server.

In another aspect, a computer system for enhancing the security of encrypted user data records is provided that includes a plurality of individual data units. Each individual data unit is associated with a respective user and stores one or more data records for the respective user. Moreover, the computer system includes at least one computing device associated with each respective user. The at least one computing device is for conducting network-based transactions and storing an encrypted logical address required to access the respective user data unit. The encrypted logical address is different for the individual data unit of each respective user. The computer system also includes a computer configured as a central user data server. The server manages the user data records and includes decryption keys for the encrypted logical addresses. The individual data units, the at least one computing device, and the central user data server communicate securely over a network.

In yet another aspect, a method for enhancing the security of user data records is provided that includes storing an encrypted user data record of each of a plurality of users on a respective data storage component. Each respective data storage component has a separate physical address and logical address, and a separate secret access code. Moreover, the method includes encrypting a logical address and an access code required to access each respective user data record, wherein the logical address and the access code are different for each respective user data storage component. Furthermore, the method includes storing the encrypted logical address and access code for each respective user data storage component on a computing device associated with the same user, and storing on a central user data server, decryption keys for the encrypted logical address and access code.

In another aspect, a method for enhancing the security of encrypted user data records is provided that includes storing a plurality of encrypted data records of each of a plurality of users on at least one separate component per user communicating with a central user data server, wherein the separate component of each user has a unique logical address, and each data record has a separate secret access code. Moreover, the method includes encrypting the logical address and the access code required to access each respective user data record. The access code is different for each respective user data record. Furthermore, the method includes storing the encrypted logical address and the encrypted access codes for each respective user data record on a computing device associated with the same user, and storing on the central user data server, decryption keys for the encrypted logical addresses, encrypted secret access codes, and encrypted user data records.

In another aspect, a method for enhancing the security of user data records is provided that includes distributing in a computer system, encrypted logical addresses, encrypted secret access codes, encrypted user data records, and decryption keys for the encrypted logical addresses, encrypted secret access codes, and the encrypted user data records such that: the data record of a user is safe against a cyber-attack that compromises only one component of the computer system; the data record of a user can be compromised only when at least two components of the computer system are compromised as the result of a cyber-attack; and the data records of N users can be stolen only when at least N+1 components of the computer system are compromised as the result of a cyber-attack, where N is the number of users.

In yet another aspect, a method for enhancing the security of user data records in a computer system using M specialized storage components storing the data of a single user only within the computer system is provided. The method includes distributing in the computer system, encrypted logical addresses, encrypted secret access codes, encrypted user data records, and decryption keys for the encrypted logical addresses, encrypted secret access codes, and encrypted user data records such that: the data record of a user is safe against a cyber-attack that compromises only M components of the computer system; the data record of a single user can be compromised only when at least M+1 components of the computer system are compromised as the result of a cyber-attack; and the data records of N users can be compromised only when at least (M×N)+1 components of the computer system are compromised as the result of a cyber-attack, where N is the number of users and M is the number of specialized storage components.

In another aspect, a hosted individual data unit platform is provided that includes a plurality of individual data units implemented within a single physical device. Each individual data unit includes a processor and a memory configured to store data. The individual data unit is associated with a network and the memory is in communication with the processor. The memory has instructions stored thereon which, when read and executed by the processor cause the individual data unit to perform basic operations only, the basic operations including communicating securely with computing devices, computer systems, and a central user data server. Moreover, the instructions when read and executed by the processor cause the individual data unit to perform basic operations including receiving a user data record, storing the user data record, retrieving the user data record, and transmitting the user data record.

In view of the above, it can be seen that the incentives for conducting cyber-attacks are dramatically reduced because a high volume of sensitive user information is not stored in a manner that renders all the data vulnerable to a single successful cyber-attack, or a small combination of such cyber-attacks. That is, the value of the target has been reduced. By reducing the payoff for any small number of successful cyber-attacks, and simultaneously raising the number of successful cyber-attacks required to access any fraction of the data, the cost-benefit ratio increases to a point where it is no longer worthwhile for cyber-criminals to attack such systems in order to obtain the user data. In large systems with hundreds of millions of users—the very systems that create such high incentives for cyber-criminals—it is impractical to distribute user data, encryption/decryption keys, and other security information in ways that achieve these goals without the inclusion of the individual data units. With the enablement of the individual data units, it is possible to distribute user data, encryption/decryption keys, and other information to enhance security for the user data.

BRIEF DESCRIPTION OF THE DRAWINGS

FIG. 4 is a table which summarizes an analysis showing that the compromise of any two components in the example computer system shown in FIG. 3 is inadequate to compromise the data record of a user;

DETAILED DESCRIPTION OF THE INVENTION

Figure 1:
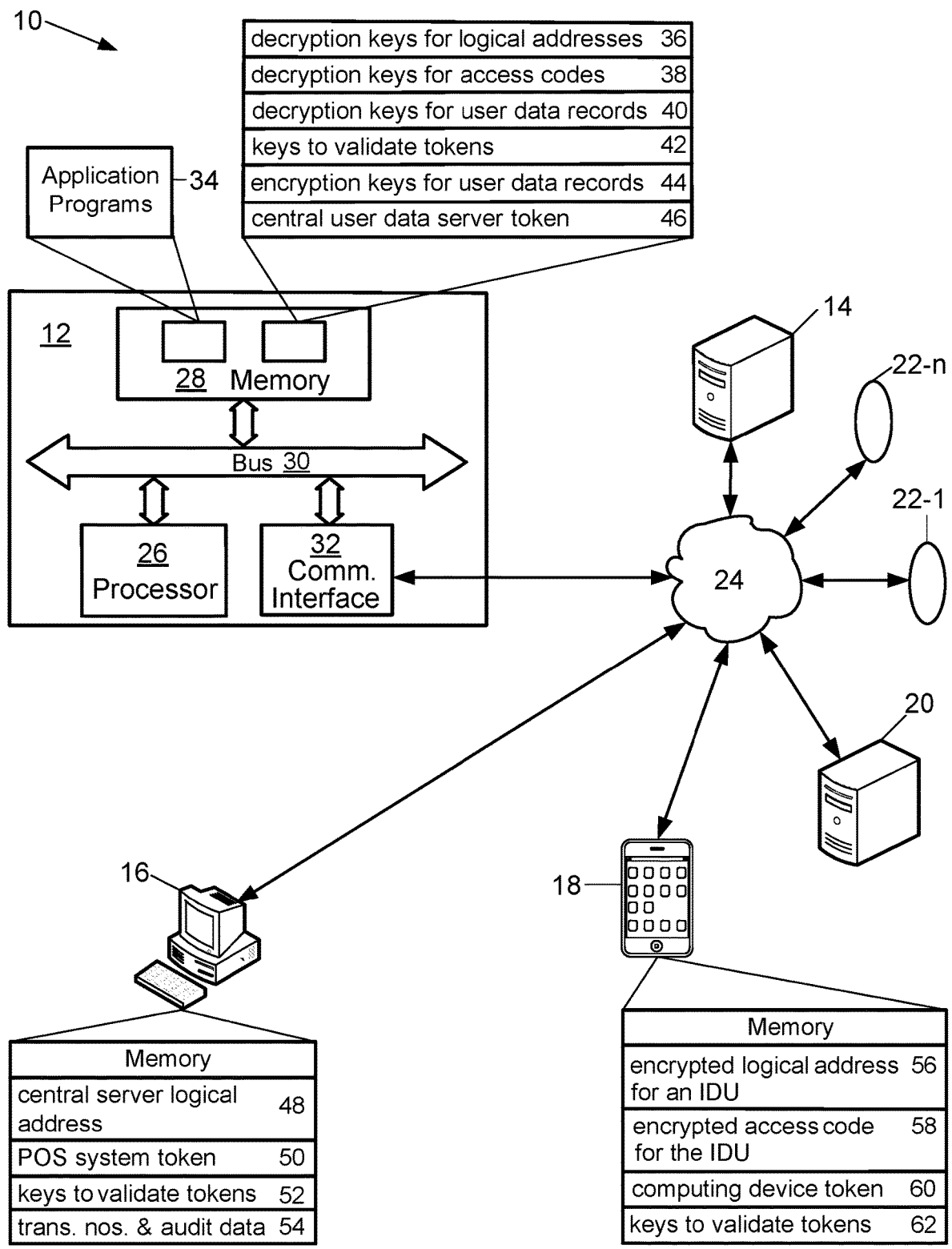
FIG. 1 is a diagram of an example computer system for enhancing the security of user data.

FIG. 1 is a diagram of an example computer system 10 for enhancing the security of user data. The computer system 10 includes an example central user data server 12, a server 14 that provides additional services to users, an example point of service (POS) computer system 16, an example computing device 18, an example authentication computer system 20, and example individual data units (IDUs) 22-1 to 22-n that communicate over a network 24. The central user data server 12 and the server 14 constitute an array of servers that communicate with each other via the network 24. The server 14 may include any number of the same or different servers that communicate with each other via the network 24. For example, the server 14 may include a web server, an application server, an authentication server, an email server, e-discovery servers, or any servers associated with any services provided over the network 24. Alternatively, the computer system 10 may not include the server 14. The designation "n" as used in conjunction with the IDUs 22-1 to 22-n is intended to indicate that any number "n" of IDUs may be included in the computer system 10.

Although the example computer system 10 includes one POS computer system 16 and one computing device 18, the example computer system 10 may alternatively include any number of POS computer systems 16 and computing devices 18. For example, there may be millions of computing devices 18, typically one or perhaps more for each user whose data is stored in the computer system 10.

Any networking scheme and any stack of network protocols may be used to support communications over the network 24 between the central user data server 12, the server 14, the POS computer system 16, the computing device 18, the authentication computer system 20, the example individual data units (IDUs) 22-1 to 22-n, and any computer systems (not shown) and computing devices (not shown) that communicate over the network 24. One example of a networking scheme and stack of protocols is Transport Control Protocol (TCP)/Internet Protocol (IP). Any type of network protocol may be used that facilitates the security of user data as described herein.

A person who obtains or purchases goods or services during a network-based transaction, or who obtains or purchases goods or services in a brick and mortar store, is referred to herein as a user. Typically, entities, for example, merchants require that users be successfully authenticated before conducting a network-based transaction with the user.

The central user data server 12 includes subcomponents such as, but not limited to, one or more processors 26, a memory 28, a bus 30, and a communications interface 32. General communication between the subcomponents in the central user data server 12 is provided via the bus 30.

The processor 26 executes instructions, or computer programs, stored in the memory 28. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

As used herein, the term "computer program" is intended to encompass an executable program that exists permanently or temporarily on any non-transitory computer-readable recordable medium that causes the central user data server 12 to perform at least a portion of the functions and/or methods described herein. Application programs 34, also known as applications, are computer programs stored in the memory 28. Application programs 34 include, but are not limited to, an operating system, an Internet browser application, authentication applications and any special computer program that manages the relationship between application software and any suitable variety of hardware that helps to make-up a computer system or computing environment.

The central user data server 12 manages user data for any type of entity, for example, a merchant. As such, the central user data server 12 performs functions including, but not limited to, establishing a central user data server token and sharing a key for validating the central user data server token, registering new user accounts, registering new POS computer systems 16, accepting new or revised data from registered users, and conducting authentication transactions. New or revised user data may include user contact information, reference authentication data, hash codes for user data, and keys to validate tokens for computing devices 18, POS computer systems 16, and IDUs 22-1 to 22-*n*. Additionally, the central user data server 12 may compute and compare hash codes for new or updated user data, and temporarily accept and use copies of encryption keys to be applied to user data being stored on the IDUs 22-1 to 22-*n*. Such temporarily accepted copies of encryption keys are securely destroyed immediately after use.

The memory 28 may be any non-transitory computer-readable recording medium used to store data such as, but not limited to, computer programs, decryption keys 36 for logical addresses of IDUs 22-1 to 22-*n*, decryption keys 38 for access codes of IDUs 22-1 to 22-*n*, decryption keys 40 for user data records, keys 42 to validate tokens from POS computer systems 16 and computing devices 18, encryption keys 44 used to encrypt user data records, and a central user data server token 46. The memory 28 may additionally include, or alternatively be, a disk storage unit (not shown) coupled to and in communication with the central user data server 12.

As used herein, a logical address includes any addressing scheme that can ultimately be used to resolve the logical address to a specific physical address within the network 24. In a TCP/IP scheme this would resolve to an IP address. An example IP address using IPv6 might be: 2001:0db8:85a3:0000:0000:8a2e:0370:7334. A logical address is typically a URL (Uniform Resource Locator) that is resolved into an IP address by a Domain Name Server (DNS). Media Access Control (MAC) addresses that are physically embedded within each device are automatically resolved using the associated protocols of TCP/IP networks. Depending on how IP addresses for IDUs are assigned and maintained, the logical addresses for IDUs described herein may be the respective IP address of each IDU.

The decryption keys 40 correspond to the encryption keys 44 used to encrypt respective user data records. The encryption 44 and decryption 40 keys are different from each other for asymmetric encryption and may be the same for symmetric encryption. In the computer system 10, all encryption-decryption pairs of keys are asymmetric cryptographic keys. However, symmetric keys may alternatively be used should the computer system 10 use asymmetric key pairs to securely transmit symmetric keys.

The encryption 44 and decryption 40 keys are different for each user data record. Because entities like merchants may collect data for millions of customers, millions of decryption keys 36, 38, and 40 may be stored in the memory 28. Although the central user data server 12 stores the decryption keys 36, 38, and 40, the central user data server 12 typically does not store information regarding the physical location or the logical address of the user data records corresponding to any of the decryption keys 36, 38, and 40. As a result, if a cyber-criminal successfully attacked the central user data server 12, the cyber-criminal would be able to steal the decryption keys 36, 38, and 40 but not information regarding the physical or logical address of the user data record. The physical or logical address as well as the access code are necessary to access the user data record corresponding to decryption keys 36, 38, and 40. Consequently, the decryption keys 36, 38, and 40 by themselves are useless to cyber-criminals.

Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like. Furthermore, the non-transitory computer-readable recording media may be implemented as smart cards, SIMs, any type of physical and/or virtual storage, or any other digital source such as a network or the Internet from which a central user data server can read computer programs, applications or executable instructions.

The communications interface 32 provides the central user data server 12 with two-way data communications. Moreover, the communications interface 32 may enable the central user data server 12 to conduct wireless communications such as cellular telephone calls or to wirelessly access the Internet over the network 24. By way of example, the communications interface 32 may be a digital subscriber line (DSL) card or modem, an integrated services digital network (ISDN) card, a cable modem, or a telephone modem to provide a data communication connection to a corresponding type of telephone line. As another example, the communications interface 32 may be a local area network (LAN) card (e.g., for Ethernet™ or an Asynchronous Transfer Model (ATM) network) to provide a data communication connection to a compatible LAN. As yet another example, the communications interface 32 may be a wire or a cable connecting the central user data server 12 with a LAN, or with accessories such as, but not limited to, keyboards or biometric capture devices used to support login by system administrators. Further, the communications interface 32 may include peripheral interface devices, such as a Universal Serial Bus (USB) interface, a PCMCIA (Personal Computer Memory Card International Association) interface, and the like. Thus, it should be understood the communications interface 32 may enable the central user data server 12 to conduct any type of wireless or wired communications such as, but not limited to, accessing the Internet.

The communications interface 32 also allows the exchange of information across the network 24. The exchange of information may involve the transmission of radio frequency (RF) signals through an antenna (not shown). Moreover, the exchange of information may be between the central user data server 12 and any other POS computer system 16, computing devices 18, and IDUs capable of communicating over the network 24.

The network 24 may be a 5G communications network. Alternatively, the network 24 may be any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 24 may include Radio Frequency Identification (RFID) subcomponents or systems for receiving information from other devices. Alternatively, or additionally, the network 24 may include subcomponents with Bluetooth, Near Field Communication (NFC), infrared, or other similar capabilities. The network 24 may also be any type of wired network or a combination of wired and wireless networks.

The POS computer system 16 may store data such as, but not limited to, a logical address 48 for the central user data server 12, a POS system token 50 for the POS computer system 16, keys 52 for validating tokens from other POS computer systems (not shown) and other computing devices (not shown), and transaction numbers and audit data 54.

One example of a POS computer system 16 is a service provider computer system that functions as a concentrator and a firewall that users communicate with to remotely obtain goods or services via the Internet. Other examples include, but are not limited to, computerized registers typically used to purchase goods inside a brick and mortar store.

The POS computer system 16 performs functions such as, but not limited to, establishing the POS computer system token 50, and sharing with other POS computer systems (not shown) and other computing devices (not shown) the key used to validate the token 50. The POS computer system 16 may also register other central user data servers (not shown), register the authentication computer system 20, conduct authentication transactions, create user data stored in a user data record, update user data stored in a user data record, and retrieve user data from a user data record. Additionally, the POS computer system 16 may include policies for determining levels of risk acceptable to the service provider for conducting different types of network-based transactions. Alternatively, the policies for determining acceptable levels of risk may be included in other computer systems (not shown). Moreover, the POS computer system 16 may access any other data or services provided by any other POS computer system (not shown).

POS computer systems 16 that are computerized registers are typically found in a brick and mortar store and typically accept payments or otherwise authenticate users. Such POS computer systems may perform other functions including, but not limited to, creating user data stored in a user data record, updating user data stored in a user data record, and retrieving user data from a user data record.

One example of the computing device 18 is a smart phone. Other examples include, but are not limited to, tablet computers, phablet computers, laptop computers, and desktop personal computers. The computing device 18 is typically associated with a user or with any type of entity including, but not limited to, commercial and non-commercial entities.

The computing device 18 associated with each respective user stores an encrypted logical address 56 of the IDU associated with the user and an encrypted access code 58 required to access the data record of the respective user. The logical address 56 is different for each IDU as is the access code 58.

The computing device 18 may also store a computing device token 60 and keys 62 to validate tokens from the central user data server 12, the server 14, the POS system 16, the authentication system 20, and any other computer systems (not shown) and any other computing devices (not shown) operable to communicate over the network 24. The logical address 56 and access code 58 are encrypted before being stored in the computing device 18. Some users might be associated with more than one computing device 18. For example, some users may be associated with a smart phone, a tablet computer, and a laptop computer. When a user is associated with more than one computing device 18, the encrypted logical address 56 and the encrypted access code 58 may be stored on each computing device 18 associated with the user.

The central user data server 12 receives the encrypted logical address 56 and the encrypted access code 58 from the user computing device 18, and decrypts the encrypted logical address 56 and the encrypted access code 58 with the decryption keys 36 and 38, respectively. Should the computing device 18 associated with a user be stolen or successfully compromised by a cyber-criminal, the encrypted logical address 56 and the encrypted access code 58 would be useless unless the central user data server 12 was also hacked and the corresponding decryption keys obtained.

The computing device 18 performs functions including, but not limited to, establishing a computing device token and sharing the key that validates the computing device token. Moreover, the computing device 18 may validate hash codes, and accept and store encrypted logical addresses and encrypted access codes for IDUs. Additionally, the computing device 18 may collect user data, and securely send the user data to the central user data server 12 which arranges for the use data to be stored on an IDU 22-1. The collected user data may include user authentication data captured by the user computing device 18. The computing device 18 may also include policies for determining levels of risk acceptable to a user for conducting different types of network-based transactions.

The authentication computer system 20 may store authentication policies, user liveness detection applications, authentication applications, and reference authentication data records. Authentication policies facilitate determining authentication data to be obtained from users during authentication transactions. Some policies may consider the maximum level of acceptable risk for a desired network-based transaction acceptable to the user and the service provider when determining the authentication data to be obtained from a user during an authentication transaction. User liveness detection applications enable determining whether or not obtained biometric authentication data is of a live person.

Authentication applications enable conducting user verification and identification transactions with any type of authentication data. The process of verifying the identity of a user is referred to as a verification transaction. Typically, during a verification transaction authentication data is captured from a user. The captured authentication data is compared against corresponding reference authentication data previously collected and stored on the authentication server and typically a matching score is calculated for the comparison. When the matching score meets or exceeds a threshold score, the captured and reference data are judged a match and the identity of the user is verified as true.

Authentication data is the identifying data desired to be used during a verification or identification transaction. Authentication data as described herein includes, but is not limited to, data of a biometric modality, combinations of data for different biometric modalities, pass-phrases, personal identification numbers (PIN), physical tokens, global positioning system coordinates (GPS), and combinations thereof. Example biometric modalities include, but are not limited to, face, iris, finger, palm, and voice. Data for such biometric modalities is typically captured as an image or an audio file that may be further processed into templates for facilitating rapid comparisons with live authentication data captured during a verification transaction.

User authentication data records include reference authentication data which is used in authentication transactions. Reference authentication data is the data registered for each user to establish his or her identity using different techniques. When authentication is based on data of a biometric modality, the reference authentication data may be as captured from a user or may be a template derived from the captured data. The authentication computer system 20 may store reference authentication data for different users on different storage devices (not shown) which may be located in different geographical locations. The authentication computer system 20 may include servers to facilitate performing complex biometric or other comparisons between captured and reference authentication data.

A merchant may conduct out-of-store network-based transactions by having the central user data server 12 communicate directly with the computing device 18 during the transactions. Alternatively, or additionally, merchants may include points of service 16 between the computing devices 18 and the central user data server 12 to minimize the number of direct connections to the central user data server 12. Such designs may include thousands of POS computer systems 16.

The POS computer system 16, computing device 18, and authentication computer system 20 typically include subcomponents similar to the subcomponents included in the central user data server 12. That is, the central user data server 12, the POS computer system 16, the computing device 18, and the authentication computer system 20 are typically general purpose computers capable of performing any of thousands of different functions when properly configured and programmed. The POS computer system 16 and the computing device 18 may also include a user interface (not shown) and a display (not shown).

The display (not shown) may include a visual display or monitor that displays information to a user. For example, the display may be a Liquid Crystal Display (LCD), active matrix display, plasma display, or cathode ray tube (CRT). The user interface (not shown) may include a keypad, a keyboard, a mouse, a light source, a microphone, cameras, and/or speakers. Moreover, the interface and the display may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the user to interact with the POS computer system 16 or the computing device 18 to enter data, change settings, control functions, etc. Consequently, when the touch screen is touched, the interface communicates this change to the processor in the POS computer system 16 or user computing device 18, and settings can be changed or information can be captured and stored in the memory.

The subcomponents of the central user data server 12, the server 14, POS computer system 16, computing device 18, and authentication computer system 20 involve complex hardware, and may include such hardware as large scale integrated circuit chips. Such complex hardware is difficult to design, program, and configure without flaws. As a result, the central user data server 12, the server 14, the POS computer system 16, the computing device 18, and the authentication computer system 20 typically include design or configuration flaws. The central user data server 12, the server 14, POS computer system 16, computing device 18, and authentication computer system 20 also run large numbers of sophisticated and complex software applications which typically include bugs, or flaws. Such sophisticated software programs typically have hundreds or thousands of known and documented flaws, and an unknown number of unknown flaws.

The general purpose nature of computers like the central user data server 12, POS computer system 16, computing device 18, and authentication computer system 20 enables them to be economically manufactured based on the production of high volumes of identical computers, each of which is custom configured by an administrator to perform desired functions. However, such economical manufacturing introduces additional complexity and the potential for human error because a person may make an error while customizing the configuration or administering day-to-day operations of the computer. Thus, the human factor involved in customizing the configuration and programming for these computers adds to security vulnerabilities that can be exploited by cyber-criminals. As a result, the overall complexity of general purpose devices introduces additional flaws that may be exploited by cyber-criminals during cyber-attacks. Any device that can serve unlimited multiple purposes is inherently more complex than a device that serves a limited purpose only.

In view of the above, it can be seen that the central user data server 12, the server 14, POS computer system 16, computing device 18, and authentication computer system 20 are vulnerable to cyber-attacks due to the complexity of their hardware and internal firmware/software, the potential for human errors, and potentially inconsistent administrative management during a lifetime of operational use. It is the flaws introduced by at least these factors that are typically exploited by cyber-criminals during cyber-attacks.

Figure 2:
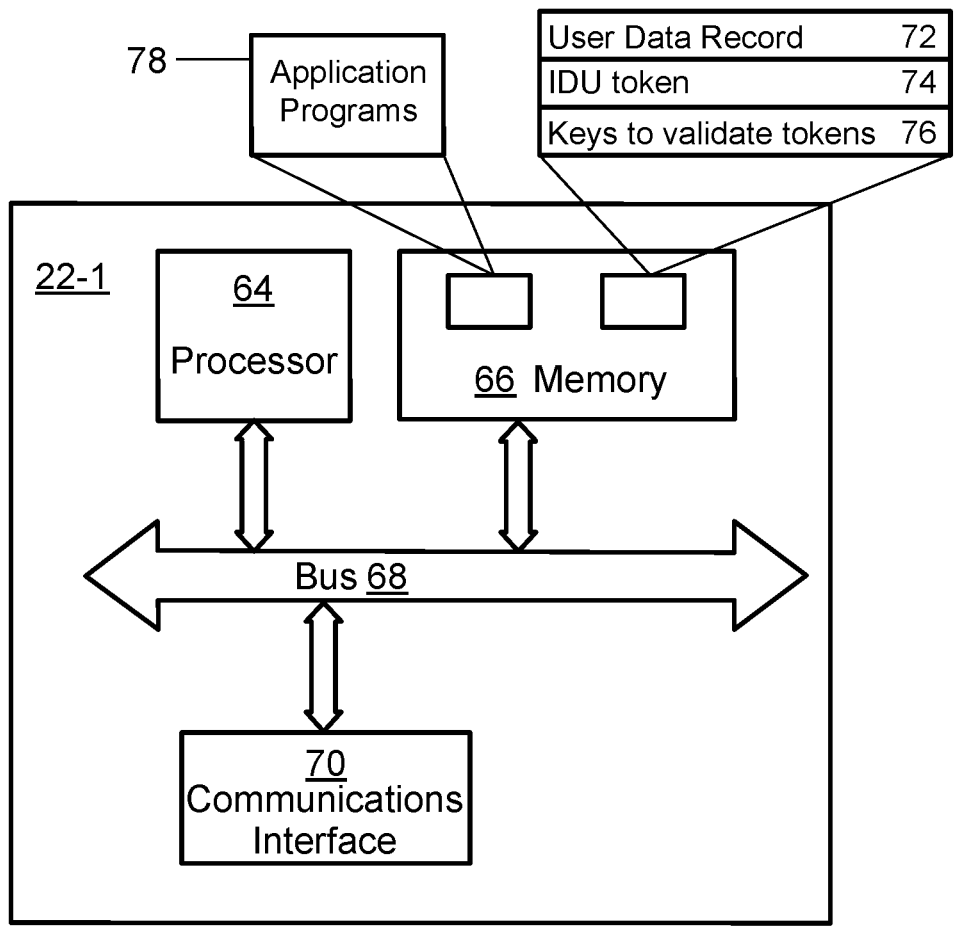
FIG. 2 is a block diagram of an example individual data unit included in the computer system as shown in FIG. 1.

FIG. 2 is a block diagram of an example IDU 22-1. Because each IDU 22-1 to 22-*n* is the same, IDU 22-1 only is described. Subcomponents of the IDU 22-1 include a processor 64, a memory 66, a bus 68, and a communications interface 70. Communication between the subcomponents is provided via the bus 68. The processor 64 executes instructions from applications 78 and other computer programs stored in the memory 66. The memory 66 may be any non-transitory computer-readable recording medium used to store data including, but not limited to, applications 78, a user data record 72, an IDU token 74, and keys 76 to validate tokens from POS computer systems 16 and computing devices 18. The encrypted user data record 72 may be decrypted by the decryption key 40. Additionally, the IDU 22-1 may include security features that are common on Hardware Security Modules such as tamper resistance and detection.

The communications interface 70 performs functions similar to those described herein for the communications interface 32. However, the communications interface 70 does not require the broad array of different communications options required of a general purpose computer. In addition, the application programs 78 of the IDU 22-1 are far less complex than the central data server application programs 34 described herein because the IDU 22-1 is specifically designed to perform a limited number of functions in a secure manner. A limited number of functions may be as many as several dozen functions, but it is not thousands, and the functions are not unlimited in scope—the functions are focused solely on operations that facilitate securing user data. These simpler applications, in turn, may be run on a smaller and less powerful processor 64 communicating across a simpler and less general purpose bus 68. As a result, the subcomponents of the IDU 22-1 are easier to design and are thus less likely to include design flaws versus general purpose computers. Likewise, the software subcomponents underlying the applications 78 of the IDU 22-1 are also orders of magnitude less complex than those in the central user data server 12, the server 14, the POS computer system 16, or the computing device 18. For instance, a general purpose operating system such as WINDOWS® or LINUX® may not be required on an IDU. The IDU 22-1 is thus not a general purpose computer. The IDU 22-1 is physically smaller, simpler, less expensive, and more secure than a general purpose computer because the IDU 22-1 is dedicated to the single purpose of securing user data.

As the number of functions that can be performed by the IDU 22-1 increases, the number of potential design flaws increases as does the software complexity. As a result, the IDU 22-1 becomes more vulnerable to successful cyber-attacks. As the number of functions that can be performed by the IDU 22-1 decreases, the number of potential design flaws decreases as does the software complexity. As a result, the IDU 22-1 is less vulnerable to successful cyber-attacks and thus facilitates increasing the security of the user data record 72 stored therein. In view of the above, it can be seen that security is facilitated to be maximized when the IDU 22-1 is specifically designed and manufactured to facilitate a single function like securely storing the data of one user.

The IDU 22-1 may be any device capable of running simple application programs 78 that enable performing basic functions only. The IDU 22-1 may alternatively perform more functions than the basic functions described herein. However, there is a tradeoff in that additional functions imply increased complexity which in turn increases the susceptibility to design or implementation flaws that can be exploited by cyber-criminals. In addition, as the complexity increases so does the possibility of errors resulting from the human factor.

The IDU 22-1 may be no larger in physical size or logical complexity than an electronic car key fob. Example basic functions include, but are not limited to, receiving and transmitting the data in the user data record 72, and storing and retrieving the data in the user data record 72. The application programs 78 are very small and simple, thus are easily verifiable and auditable and typically include few if any flaws. Consequently, the IDU 22-1 has fewer software flaws that can be exploited by cyber-criminals conducting cyber-attacks. Because the IDU 22-1 has fewer design and software flaws, the IDU 22-1 is more secure against cyber-attacks than general purpose devices like mobile phones or small laptop computers.

Other basic functions that may be performed by the IDU 22-1 include, but are not limited to, establishing the IDU token 74, sharing a key used to validate the IDU token, and receiving and storing setup information from a user via a computing device 18 or buttons and displays on the IDU itself. Such setup information may include information for connecting the IDU to a the network 24, information required to establish the physical and logical address of the IDU 22-1, information to establish keys to validate tokens from servers or devices that may communicate directly with the IDU 22-1, and information for establishing restrictions on which sources of network messages may be processed.

The IDU 22-1 may also receive via the network 24 the encryption key 44 and a user data record, encrypt the user data record with the encryption key 44, and store the encrypted user data record as the user data record 72 in the memory 66. Additionally, the IDU 22-1 may receive the encryption key 44 and store the key 44 in the memory 66.

Upon receiving a user data record and a request from the central user data server 12, the IDU 22-1 may encrypt the received user data record and store the encrypted user data record as the user data record 72 in the memory 66. The IDU 22-1 may also receive the decryption key 40 and decrypt the user data record 72 stored therein using the decryption key 40.

Alternatively, or additionally, the IDU 22-1 may encrypt the logical address 56 and access code 58, compute a hash code for the user data record 72, and send the encrypted logical address 56, the encrypted access code 58, and the hash code to the computing device 18. The IDU 22-1 may also send to the central user data server 12 decryption keys for the logical address 56 and access code 58 of the IDU 22-1 as well as the decryption key 40 for the user data record 72, and a hash code for the user data record 72. The IDU 22-1 may also obfuscate physical addresses or use dark net technologies to improve anonymity of the IDU and protect the IDU against sniffing and traffic analysis threats. Additionally, the IDU 22-1 may back-up the user data record 72 to any computing device or computer system included in the computer system 10. The IDU 22-1 may also detect networks, accept inputs to complete connection to a network, automatically restore connection to the network after the connection is temporarily disrupted, display the status of a network connection, and restrict network access to the IDU 22-1 to only specified computing devices and computer systems. The inputs may be entered using buttons or displays on the IDU 22-1.

The IDU 22-1 may also include basic functions to change the physical or logical addresses of the IDU, and change the access code 58 required to access the user data record 72.

A most likely additional function of the IDU 22-1 is storing multiple data records 72 for one user who interacts with multiple service providers. When multiple data records 72 are stored in the IDU 22-1, the data from one service provider is not disclosed to a different service provider. Moreover, an access code for each of the multiple data records 72 is stored in the IDU 22-1. Each different access code corresponds to a different service provider with whom the user interacts. The IDU 22-1 responds to an incoming communication only when an access code in the communication matches one of the multiple access codes stored therein. Alternatively, the IDU may use a completely separate access code for authorizing access to the IDU that is different from the access codes used to authorize access to specific user data records. Adding such simple functions to the IDU does not remove the characteristic of being orders of magnitude less complex than a general purpose computer and thus far more secure.

The user data record 72 may include any information about a user as well as information collected by a service provider about the user. For example, data collected by airlines for a passenger may include the name, date of birth, passport number, billing address, credit card information, and various flight preferences such as aisle or window seating of the passenger. Thus, the user data record 72 of an airline passenger, or user, typically includes such information. Additional data that may be stored in a user data record 72 includes, but is not limited to, reference authentication data, and the user's gender, age, citizenship and marital status. Although the user data record 72 is stored in the IDU 22-1, the central user data server 12 orchestrates access to the user data record 72.

Each IDU 22-1 to 22-n included in the computer data system 10 is associated with a respective user and stores the data for that respective user in a user data record 72. Storing the data for each user in a respective user data record 72 decentralizes user data. This decentralization combined with secure distributions of data and decryption keys results in the user data records 72 constituting a less attractive target to cyber-criminals than a centralized data base because a limited number of successful cyber-attacks will only compromise the data of one or a few users. That is, decentralization of the user data records 72 enhances security for user data by both increasing the cost and decreasing the benefit for cyber-criminals to conduct attacks.

Compromise as used herein is intended to mean gaining access to data on a computing device or computer system that was intended to be secret. For example, in order to compromise all of the user data managed by the central user data server 12 a cyber-criminal would need to successfully gain access to the all the encrypted logical addresses 56, all the encrypted access codes 58 as well as the central user data server 12 itself. Additionally, if a cyber-criminal compromised the IDU or computing device 18 of a user, the cyber-criminal would not have sufficient information to access and decrypt the data record 72 of that user.

The IDU for each respective user may be located at and operated from a geographical location associated with the respective user. Alternatively, the IDU for each respective user may be located at and operated from geographic locations not associated with the respective user. Such alternative locations may include co-location with the central user data server 12, or locations not co-located with the central user data server 12. Hence, the IDUs may be geographically distributed and may thus alternatively be referred to as distributed data units. Because the IDUs may be geographically distributed the user data records 72 may also be geographically distributed.

As the IDU 22-1 is simple, the IDU 22-1 is very inexpensive relative to general purpose computing devices such as laptops or mobile phones. This low cost makes the massive distribution of user data via IDUs practical. Such massive distribution and effective security would not be practical, for instance, using a second mobile phone for each user. This is because mobile phones would be orders of magnitude more costly than the IDUs. In addition, mobile phones are general purpose devices and as such are far more susceptible to successful cyber-attacks.

A user is typically responsible for managing his or her IDU. Some users wish to retain personal control over their IDU to prevent mismanagement of the user data record 72 stored therein by a third party, and to avoid human error by a third party that may leave the user data record 72 stored therein more vulnerable to successful cyber-attacks. These users believe that the user data record 72 stored in his or her IDU is more secure when managed by his or her self. As part of managing his or her user data record 72, some users may purchase several IDUs to more thoroughly distribute his or her user data and decryption keys to further enhance security against cyber-attacks. Thus, it should be understood that using multiple IDUs may facilitate increasing the security of user data records 72 to arbitrarily high levels.

Although the access code 58 facilitates enhancing the security of user data records 72, some users who manage the user data record 72 in his or her IDU may decide that an access code is not necessary to meet his or her desired level of data security. Thus, the access code 58 may alternatively not be stored in the computing devices 18 of such users. As a result, for such users the access code 58 is not factored into the security of his or her user data record 72. It should be understood that by not using the access code 58, security of the user data record 72 may be reduced. IDU manufacturers may omit the implementation of an access code, or for IDUs that include the option of using an access code users may indicate during setup of the IDU that the access code 58 is not to be used, for example, by activating a switch on the IDU 22-1 or by interacting with an application on the computing device 18 to configure the IDU. Users who decide to enhance security for his or her IDU may indicate in the same manner that the access code 58 is to be used. The access code is optional because the IDU 22-1 provides orders of magnitude better security than current systems, even without an access code.

Instead of geographically distributing the IDUs and thus the user data records 72, the IDUs may alternatively be co-located with the central user data server 12. Specifically, the IDUs of multiple users may be physically co-located within one or more physical devices accessed by the central user data server 12. For example using Large Scale Integrated Circuits (LSICs) or Application Specific Integrated Circuits (ASICs), a single circuit board could host the equivalent of hundreds or thousands of individual IDUs. Such a large number of IDUs, whether hosted on an integrated circuit board or not, is referred to herein as a "hosted IDU platform" and all the included IDUs are managed by a third party instead of by the individual users. However, it should be understood that IDUs implemented in this manner each retain a unique logical address and a unique access code and would need to be individually compromised by a cyber-criminal attempting to access all the user data in the physical device. IDUs hosted on the IDU platform may also retain unique physical addresses within each circuit board. The IDUs may alternatively, or additionally, be similarly included on a hosted IDU platform in any other computer system (not shown) or any other computing device (not shown) capable of communicating with the central user data server over the network 24.

It should be understood that each IDU in a hosted IDU platform is considered a separate component for purposes of describing or calculating the security protections afforded to the user data record 72 of each IDU included in a hosted platform.

The circuit board may have a single physical address that encompasses all of the IDUs on the circuit board, in which case there is a unique logical address or a unique access code or both for accessing the IDU of each user within the circuit board. Alternatively, each IDU on each circuit board may have a different physical address, a unique and secret logical address, and a secret access code that adds a layer of security.

Each individual data unit has functions including, but not limited to, functions for power supply, external connections, tamper resistance, tamper detection, encryption, decryption, and communications with other computing devices. When the IDUs are physically co-located within one or more physical devices, it should be appreciated that some or all of these functions may be shared between the IDUs.

When the circuit board assigns unique IP addresses to each IDU on the circuit board, it is possible to build dark net technologies into the circuit boards that could mask the IP addresses of the individual IDUs, thus adding yet another layer of security. The most common dark net technique for masking IP addresses includes a processor on the circuit board that acts as an intermediate web node that is the only real IP address that can be observed while monitoring network traffic. This node would assign changing virtual IP addresses to the IDUs and use these virtual IP addresses when communicating with external computers. When the non-IDU computers use the virtual IP address to respond to the IDU, this node translates the virtual IP address into the real physical IP address of the IDU being addressed. Such dark net techniques are not restricted to hosted IDU platforms and could also be applied to IDUs that are not part of a hosted platform.

A hosted IDU platform utilizing multiple IDUs on a single circuit board facilitates reducing manufacturing costs and also facilitates third party management of the data records 72 for any user not interested in managing his or her user data record 72. If dark net technologies are included on the circuit board, the hosted IDU platform facilitates further enhancing the security of user data records 72 stored on these IDUs.

Because some users prefer to personally manage the data record 72 in his or her IDU and others prefer third party management, the computer system 10 includes both personally managed IDUs 22-1 to 22-n as well as hosted IDU platforms (not shown) managed by third parties. Alternatively, the computer system 10 may include personally managed IDUs 22-1 to 22-n only, or hosted IDU platforms only (not shown).

In current state-of-the-art computer systems with distributed and encrypted user data records, the associated addresses and decryption keys for the user data records are typically stored on the central user data server only. Storing the user data records 72, encrypted logical addresses 56 of those records, encrypted access codes 58, and associated decryption keys 36, 38, and 40 on different computer systems and different computing devices that are not all known to the central data server enhances the difficulty of compromising any user data record 72 in a single cyber-attack because at least two physically separate computer systems must be compromised instead of one and successfully compromising two computer systems yields only a single user data record. Compromising the data records 72 of all users, or a large number of users, for example a million users, requires compromising N plus one separate computers where N is the number of users. That is, the resources required to obtain user data increases proportionately to the amount of data to be compromised.

In the example computer system 10, a cyber-criminal needs to successfully compromise one of the following pairs of computers and/or computing devices to compromise the user data record 72 for a single user: 1) central user data server 12 and IDU 22-1; 2) central user data server 12 and user computing device 18; or, 3) user computing device 18 and IDU 22-1. After the central user data server 12 is compromised in a successful cyber-attack, the central user data server 12 need not be attacked again because the information stored therein was already obtained. However, to compromise a million users by attacking the first and second pairs, cyber-criminals need to replicate successful attacks against either a million computing devices 18 or a million IDUs. To compromise a million users by attacking the third pair listed above, cyber-criminals need to replicate successful attacks against a million computing devices 18 as well as a million IDUs. As a result, the attractiveness of attacking the computer system 10 is facilitated to be reduced and the security of the user data records 72 is facilitated to be enhanced because a single or small number of user data records 72 is typically of little value to cyber-criminals.

IDUs enable additional locations for storing data and keys which facilitates increasing the number of successful cyber-attacks required to compromise any of the user data in the computer system 10 compared to known state-of-the-art security methods. Moreover, the hacking effort required by cyber-criminals to compromise a large number of IDUs and computing devices 18 increases in direct proportion to the number of users being attacked.

Figure 3:
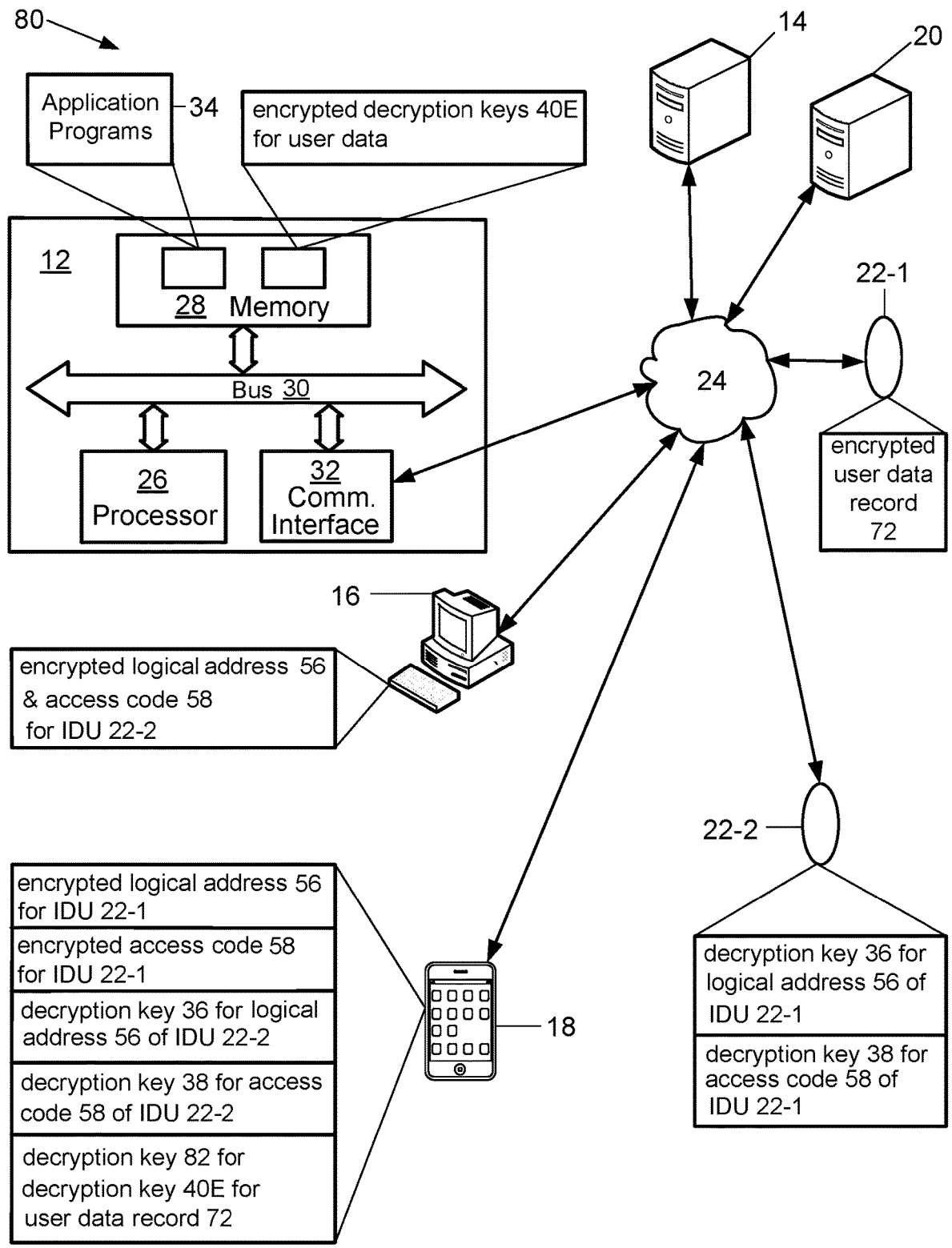
FIG. 3 is a diagram of an example computer system that expands on the example computer system shown in FIG. 1 by including two individual data units for one user and showing an example distribution of encrypted logical addresses, encrypted access codes and decryption keys that increases the security of user data for that user.

FIG. 3 is a diagram of an example computer system 80 that expands on the computer system 10 shown in FIG. 1 by including two IDUs 22-1 and 22-2 for one user, and showing an example distribution of encrypted logical addresses 56, encrypted access codes 58, and decryption keys 36, 38, and 40E that increases the security of user data for that user. The encrypted decryption key 40E for user data is the same as the decryption key 40 for user data shown in FIG. 1; however, the decryption key 40E is encrypted. Additionally, the encrypted logical addresses 56, encrypted access codes 58, and decryption keys 36, 38, 40E are distributed throughout the computer system 80 in a manner that enhances the difficulty of compromising the user data record 72 because at least three physically separate components of the computer system 80 need to be compromised instead of two. More specifically, the encrypted logical address 56 and encrypted access code 58 for IDU 22-2 are stored on the POS computer system 16, the decryption keys 36, 38 for IDU 22-1 are stored on the IDU 22-2, the encrypted user data record 72 is stored on the IDU 22-1, and the decryption key 40E is stored in the central user data server 12. Additionally, the encrypted logical address 56 for IDU 22-1, the encrypted access code 58 for IDU 22-1, the decryption keys 36, 38 for the IDU 22-2, and a decryption key 82 for the decryption key 40E are stored in the user computing device 18. The central user data server 12 may also store additional encrypted decryption keys 40E in the event that each IDU for that user is encrypted with a different key. That is, different users encrypt user data using different encryption keys, but a single user may encrypt his or her user data stored on multiple IDUs using either the same encryption key or different encryption keys.

Associating users with two IDUs facilitates distributing the encrypted logical addresses 56, the encrypted access codes 58, and the decryption keys 36, 38, 40E in a manner that requires compromising at least three components of the computer system 80 to gain access to the data record 72 of a single user. Increasing the number of IDUs associated with each user facilitates causing cyber-criminals to compromise M+1 components of the computer system 80 to access the data record 72 of a single user, where M is the total number of IDUs used by each user to distribute encrypted logical addresses 56, encrypted access codes 58, and decryption keys 40, or fractional parts thereof. That is, for users associated with two IDUs, M=2. If all users of the computer system 80 use two IDUs in the described manner, then a cyber-attack would have to compromise at least (M×N)+1 components of the computer system 80 to compromise all the user data in the system 80, where N is the number of users in the computer system 80. Thus, it can be seen that the security of all user data in the computer system 80 is enhanced by orders of magnitude rather than incrementally.

Although the user is associated with two IDUs 22-1 and 22-2 in the computer system 80, each user may alternatively be associated with any number of IDUs such that any subset of users or all users are associated with multiple IDUs. When a user is associated with more than one IDU, each IDU associated with that user may store the same user data record 72. The extra IDUs improve redundancy and thus the reliability of storage for the user data record 72. For example, by replicating the user data record 72 in multiple IDUs and distributing the IDUs across different networks and different power sources, a user can protect against network or power failures. Alternatively, a subset of users could elect to use a separate IDU for each service provider storing their user data. Security of user data records 72 may be further enhanced by breaking the encrypted logical addresses 56, the encrypted access codes 58, and the decryption keys 36, 38, 40E into fractional parts and distributing the parts to an arbitrary number of IDUs.

Allowing encrypted access code 58 use to be optional, associating users with more than one IDU, and breaking data into parts which are distributed amongst the components of the computer system 80 are factors effecting the security of user data records 72. By manipulating at least these factors any single user, any subset of users, or all users can facilitate increasing the security and reliability of his or her user data records 72. Thus, it should be appreciated that the level of security for the data record 72 of each user can be tailored by the respective user in many different ways. For example, some users may opt to use the access code 58 while others may not, some users may opt to use multiple IDUs while others may not, and some users may opt to break data into parts while others may not.

Instead of distributing the data and keys as described herein with regard to the computer system 80 as shown in FIG. 3, the data and keys may be distributed in the computer system 80 similar to the distribution described with regard to the computer system 80 as shown in FIG. 3 except as follows: adding centralized storage of encrypted user data records 72 attached directly to the central user data server 12, or adding network 24 storage of encrypted user data records 72 accessible to the central user data server 12 instead of storing user data records 72 on IDUs; and, distributing the encrypted decryption keys for user data 40E in the IDU 22-1 instead of in the central user data server 12. Such an alternative distribution of data and keys requires the compromise of at least three separate components to compromise the data for a single user and the compromise of (2×N)+1 components to compromise all the user data for all the users. The tradeoff is that central user data server 12 is more vulnerable to a brute force attacks of all the encrypted user data records 72 stored in the central location. This tradeoff may be acceptable to many network service providers.

It should be appreciated that such a distribution of data and keys facilitates achieving most of the security advantages of IDUs in legacy computer systems with centralized storage of user data records 72, but without having to immediately distribute the user data records 72 centrally stored therein to IDUs.

FIG. 4 is a table 84 which summarizes an analysis showing that compromising any two components of the computer system 80 is not sufficient to compromise a user data record 72. For example, it can be seen from the first line of table 84 that when the computing device 18 and the IDU 22-2 of a user are compromised, the data record 72 of the user is not compromised because the cyber-criminal does not have the encrypted decryption key 40E from the central user data server 12. As another example, as can be seen from the seventh line of the table 84, when IDU 22-1 and IDU 22-2 are compromised, the data record 72 of the user is not compromised because the cyber-criminal does not have the encrypted decryption key 40E from the central user data server 12 and does not have the decryption key 82 from the computing device 18 of the user. The same is true when the POS computer system 16 and the IDU 22-1 of a user are compromised. As yet another example, as can be seen from the third line of the table 84, when the computing device 18 of the user and the central user data server 12 are compromised, the data record 72 of the user is not compromised because the cyber-criminal does not have the decryption keys 36 and 38 for the encrypted logical address 56 and encrypted access code 58, respectively, of the IDU 22-1.

In view of the above, it should be appreciated that cyber-criminals need to compromise at least three components of the computer system 10, the computer system 80, or any similar computer system to compromise the data record 72 of a single user, and (2×N)+1 components to compromise all the data for N users if all the users are using two IDUs configured for additional security as described herein with regard to FIG. 3. By continuing to add IDUs for each user it is possible to continue increasing the security such that (M×N)+1 components must be compromised to compromise all the data for N users if all the users are using M IDUs configured for additional security.

Figure 5:
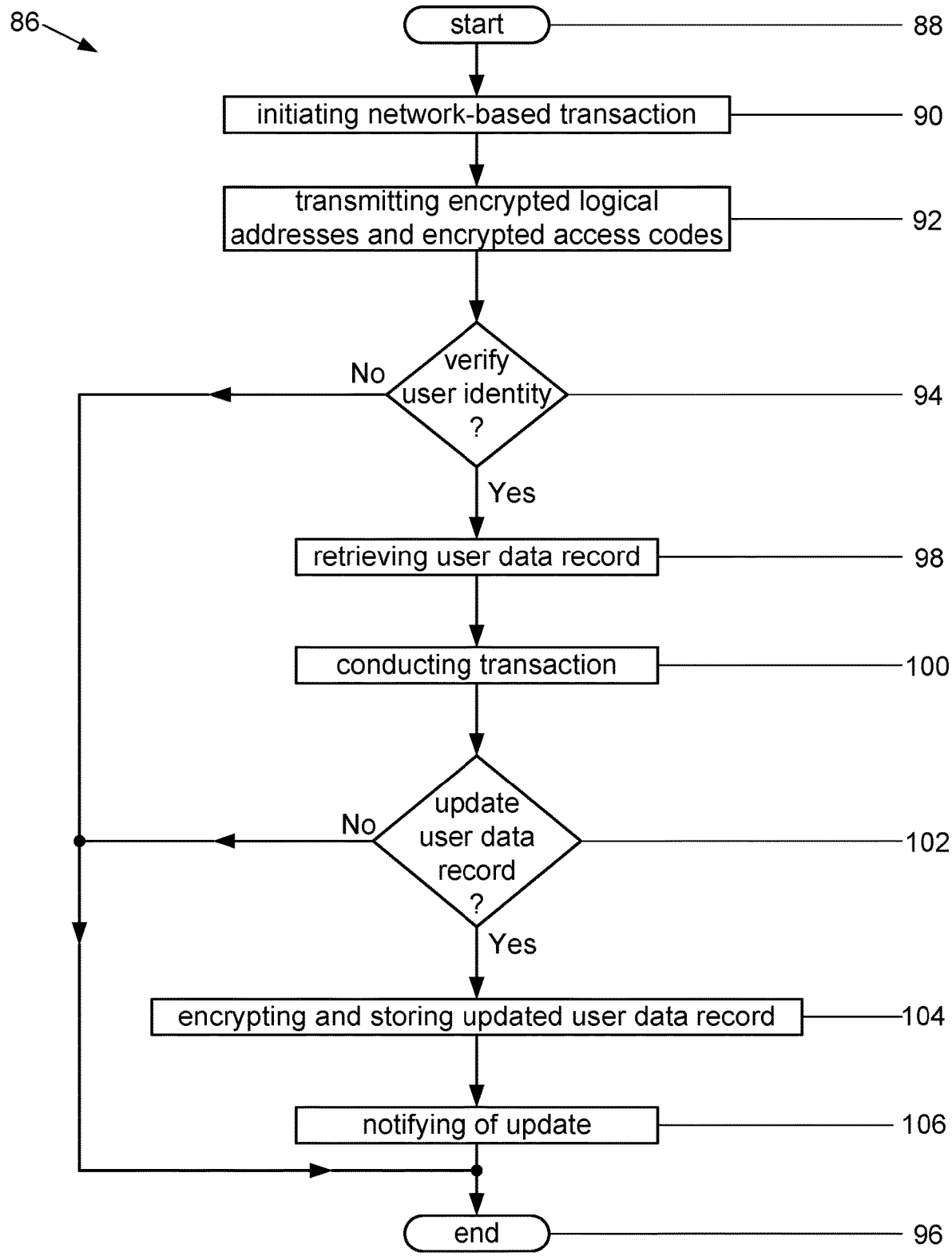
FIG. 5 is a flowchart illustrating an example method for updating a user data record in the computer system as shown in FIG. 1.

FIG. 5 is a flowchart 86 illustrating an example method for updating a user data record 72 in the computer system 10 as shown in FIG. 1. The method starts 88 with a user operating his or her computing device 18 to request initiating 90 a network-based transaction with the POS computer system 16. Such transactions include, but are not limited to, purchasing merchandise from a merchant website, purchasing an airline ticket, and accessing information from a computer system. For an airline, information that may be accessed might include the date, times, and costs of available flights. In addition to initiating 90 the network based transaction, the computing device 18 of the requesting user transmits 92 to the POS computer system 16 the encrypted logical address 56 and encrypted access code 58 for the IDU associated with the requesting user to enable retrieval of the user data record 72. If the requesting user is associated with multiple IDUs, then the encrypted logical address 56 and encrypted access code 58 for each IDU associated with the requesting user are transmitted.

In response, the POS computer system 16 continues by requesting that the authentication computer system 20 verify 94 the identity of the requesting user in a verification transaction. Alternatively, the POS computer system 16 may conduct the verification transaction. Verification of the user identity implicitly authorizes the requesting user to conduct the transaction. Alternatively, the POS system 12 may continue by determining whether or not a verified user is authorized to execute a requested transaction.

When the identity of the user is not verified 94, the POS computer system 16 does not conduct the requested network-based transaction, may notify the user of the unsuccessful verification, and processing ends 96. Otherwise, the POS computer system 16 continues by retrieving 98 the user data record 72. More specifically, the POS computer system 16 continues by automatically transmitting the encrypted logical address 56 and encrypted access code 58 to the central user data server 12. The central user data server 12 uses the decryption keys 36 and 38 to decrypt the encrypted logical address 56 and the encrypted access code 58, respectively, and uses the logical address 56 and access code 58 to access the user data record 72 in the IDU 22-1 of the requesting user. The central user data server 12 then decrypts the user data record 72 using the decryption key 40 and transmits the decrypted user data record 72 to the POS computer system 16.

Next, the POS computer system 16 continues by conducting 100 the transaction, which may or may not involve updates to the user data record 72. Conducting 100 the transaction may involve multiple communications over the network 24 with the computing device 18 of the requesting user, resulting from, for example, retrieving multiple airline flight schedules before purchasing tickets.

After conducting 100 the transaction, processing continues by deciding 102 whether or not to update the data record 72 of the requesting user. The decision to update is based on whether the requesting user changed any information stored in his or her user data record 72, or whether the transaction included additional information that should be stored in the data record 72 of the requesting user. Such changes may include changing his or her mailing address and such additional information may include data regarding a purchase. Alternatively, any other criteria may be used to determine if the user data record should be updated. If no update 102 is required, processing ends 96.

If the user data record 72 is to be updated 102, the POS computer system 16 continues by updating the data record 72 of the requesting user, and requesting encryption and storage 104 of the updated user data record 72. More specifically, the POS computer system 16 continues by transmitting the updated user data record 72 and the encrypted logical address 56 and encrypted access code 58 for the IDU associated with the requesting user to the central user data server 12. The central user data server 12 continues processing by encrypting 104 the user data record 72 using the encryption key 44, decrypting the encrypted logical address 56 and the encrypted access code 58 for the IDU of the requesting user, and storing 104 the updated data record 72 on the IDU associated with the requesting user.

Next, the central user data server 12 continues by notifying 106 the POS computer system 16 that the user data record 72 was successfully updated and stored in the IDU associated with the user. In response, the POS computer system 16 continues by notifying the computing device 18 of the requesting user that the network-based transaction was completed. Depending on the type of network based transaction, the computing device 10 of the requesting user may or may not display an acknowledgement for the user to see. Next, processing ends 96.

Although the example method for updating a user data record 72 implicitly releases the encrypted logical address 56 and encrypted access code 58 for the IDU of the requesting user from the computing device 18 of the requesting user after successful verification, this release may alternatively not be implicitly authorized after successful verification. Rather, the POS computer system 16 may request the encrypted logical address 56 and the encrypted access code 58 from the computing device 18 of the requesting user, and the requesting user may be required to explicitly authorize the release of the encrypted logical address 56 and the encrypted access code 58 from the computing device of the requesting user. The user may authorize release in any manner, for example, by speaking a voice command into the computing device 16 or by pressing a button or icon on the computing device 18.

Although the updated user data record 72 is encrypted and stored 104 after each update 102 in the example method for updating a user data record 72, the updated user data record 72 may alternatively be encrypted 104 and stored 104 after the end of the user session or after a set number of network-based transactions have been conducted and the results for the set number of transactions have been accumulated by the POS computer system 16. The set number of transactions may be any number that facilitates efficiently updating user data records 72.

Although the POS computer system 16 conducts the network-based transaction in the example method, the network-based transaction may alternatively be conducted directly between the computer device 18 of the requesting user and the central user data server 12. In such network-based transactions, the user data record 72 is updated by the central user data server 12 to include data collected from the computing device 18 of the requesting user. Moreover, in such network-based transactions, the central user data server 12 may perform all the functions that the POS computer system 16 performs in the example method.

It should be understood that communications over the network 24 may be secured in any manner. For example, a decrypted user data record 72 may be temporarily encrypted while being transmitted over the network 24 from the central user data server 12 to the POS computer system 16.

Although the computing device 18 of the requesting user transmits 92 the encrypted logical address 56 and encrypted access code 58 for each IDU associated with the requesting user, the computing device 18 of the requesting user may alternatively transmit the encrypted logical address 56 and encrypted access code 58 for a single IDU associated with the requesting user to the central user data server 12. The other encrypted logical addresses 56 and encrypted access codes 58 could be sent upon central user data server request. The encrypted logical addresses 56 and encrypted access codes 58 may alternatively be sent according to many different protocols.

Figure 6:
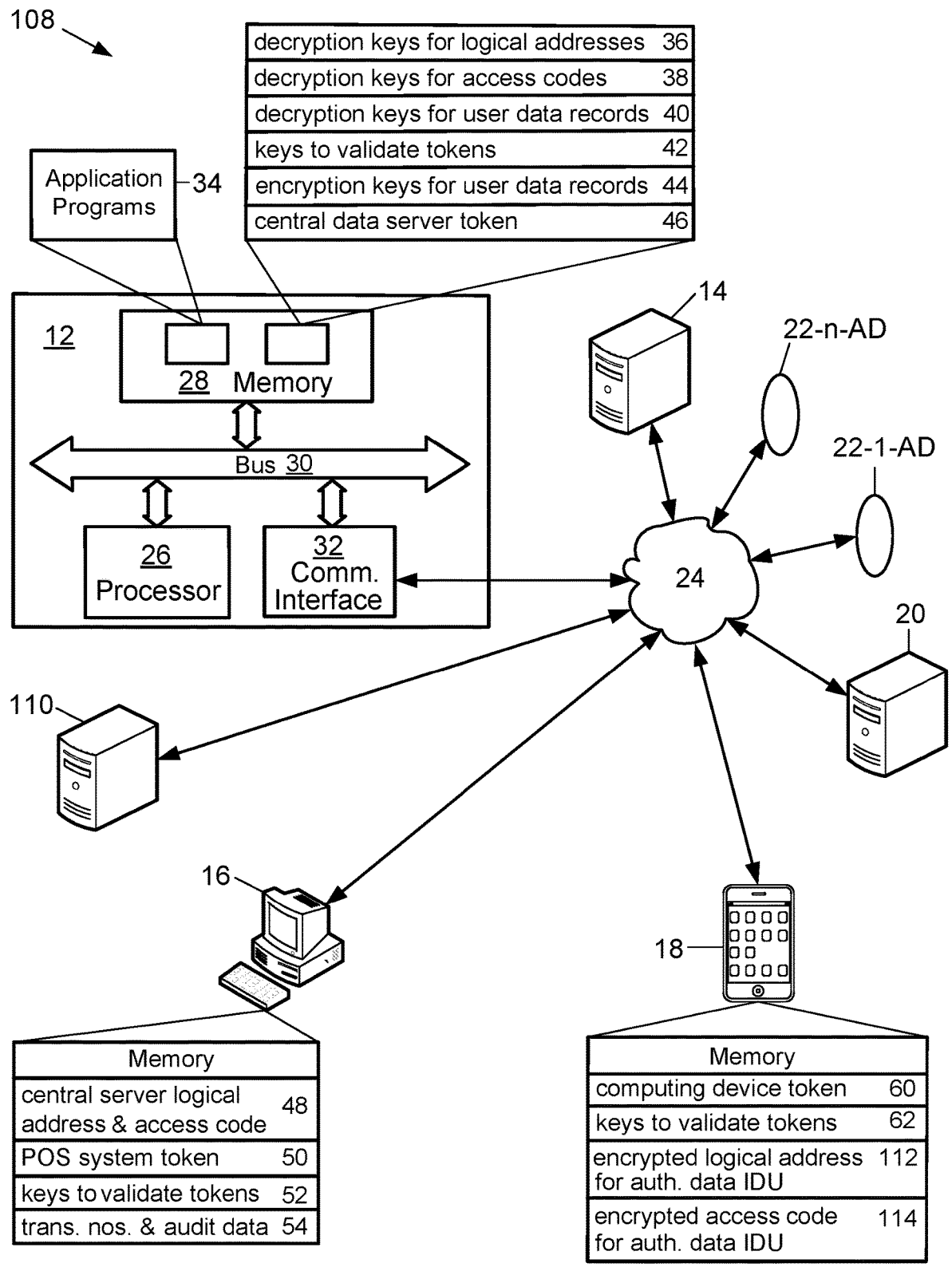
FIG. 6 is a diagram of an example Identity Management System (IDMS) for conducting authentication transactions that includes individual data units which store user data.

FIG. 6 is a diagram of an example Identity Management System (IDMS) 108 for conducting authentication transactions that uses IDUs to store user data associated with the IDMS function. FIG. 6 includes similar information as FIG. 1. Consequently, features illustrated in FIG. 6 that are identical to features illustrated in FIG. 1 are identified using the same reference numerals in FIG. 6. The example IDMS 108 is similar to the computer system 10 shown in FIG. 1. However, the IDMS 108 includes an external computer system 110 and the IDUs store reference authentication data only. Because the IDUs store reference authentication data only, the IDUs are described herein as authentication data IDUs and are identified with reference numerals 22-1-AD to 22-n-AD. The computing device 18 of each user stores the token 60 and keys 62, an encrypted logical address 112 and an encrypted access code 114 for the authentication data IDU of a respective user.

The IDMS 108 may be used to facilitate conducting verification transactions. For example, for users desiring to conduct a network-based transaction with the external computer system 110 using his or her computing device 18, the external computer system 110 may communicate with the IDMS 108 to authenticate the user before allowing the user to conduct the desired transaction. More specifically, after receiving a request to conduct the desired transaction, the external computer system 110 may transmit to the POS computer system 16 a request to authenticate the user. The POS computer system 16 may transmit the authentication request to the authentication computer system 20. By virtue of receiving and transmitting the authentication request, the POS computer system 16 can be said to function as a firewall. Alternatively, the external computer system 110 may transmit the authentication request directly to the authentication computer system 20.

Figure 7:
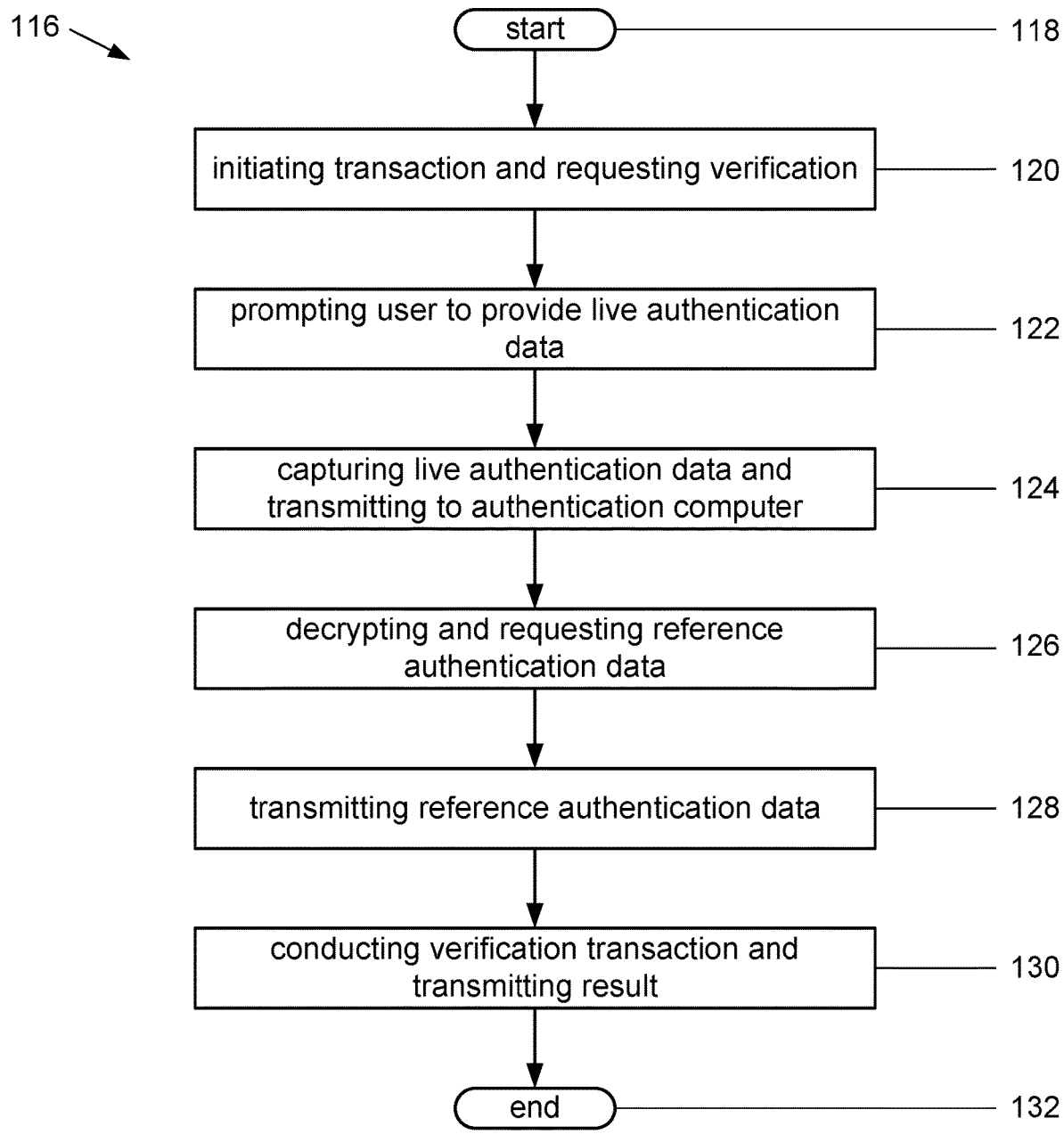
FIG. 7 is a flowchart illustrating an example method for authenticating a user using the example IDMS and individual data units as shown in FIG. 6.

FIG. 7 is a flowchart 116 illustrating an example method for authenticating a user using the example IDMS 108 and IDUs as shown in FIG. 6. In this example method, reference authentication data is stored in the IDU associated with the user. The method starts 118 with a user initiating 120 a transaction with the external system 110 using his or her computing device 18. In response, the external system 110 continues by requesting 120 that the IDMS 108 verify the identity of the user. More specifically, the external system 110 transmits the request to the POS computer system 16 which forwards the authentication request to the authentication computer system 20 together with any information required to communicate with the computing device 18 of the user. Next, the authentication computer system 20 continues by instructing the computing device 18 of the user to capture live authentication data from the user. In the example method, the live authentication data is data for a biometric modality. In response, the computing device 18 continues by prompting 122 the user to capture live authentication data of his or her self.

Next, the user responds to the prompt by capturing 124 live authentication data of his or her self with the computing device 18 which continues by transmitting 124 the captured live authentication data to the authentication computer system 20. The computing device 18 also transmits 124 to the authentication computer system 20 the encrypted logical address 112 and the encrypted access code 114 for the authentication data IDU 22-1-AD of the user. The authentication computer system 20 continues by transmitting the captured live authentication data, the encrypted logical address 112, and the encrypted access code 114 to the central user data server 12 with a request to retrieve the reference authentication data from the IDU 22-1-AD associated with the user. The central user data server 12 continues by decrypting 126 the encrypted logical address 112 and the encrypted access code 114 using the decryption keys 36 and 38, respectively, then requesting 126 the reference authentication data of the user from the authentication data IDU 22-1-AD of the user.

In response, the authentication data IDU 22-1-AD of the user continues by transmitting 128 the encrypted reference authentication data of the user to the central user data server 12. Next, the central user data server 12 continues by decrypting the reference authentication data using the decryption key 40, computing and validating a hash code that proves the reference authentication data has not been tampered with, and transmitting the reference authentication data and validation result to the authentication computer system 20. The authentication computer system 20 may alternatively calculate and validate the hash code for the reference authentication data. After receiving the reference authentication data and validation result from the central user data server 12, the authentication computer system 20 continues by conducting 130 a verification transaction with the decrypted reference authentication data and the captured live authentication data, and transmitting 130 the verification transaction result to the external system 110. Next, processing ends 132.

Users may use several different IDUs to partition and separately store different kinds of reference authentication data. For example, a user may store fingerprints from his or her right hand on one IDU, fingerprints from his or her left hand on a second IDU, a facial image on another IDU, and a voice print on yet another different IDU. By partitioning the reference authentication data of a user in this manner, even if one IDU was compromised, uncompromised data would still exist in another different IDU.

IDUs may also be used to help create very secure email systems. Email systems may be secure or non-secure. Non-secure email systems typically include an email server which stores emails in a database and which manages access to the emails based on a password only. In a non-secure email system, if the email password of a user is compromised, all email content for that user could be compromised. If the password of an email administrator is compromised, all the emails for all the users in the email system could be compromised. Secure email systems typically include an email server, a database for non-secure email contents and a separate database for secure email contents. Generally, upon receiving a secure email an email server stores the contents of the secure email in the secure email database, assigns a transaction number to the received secure email, and creates a link between the transaction number and the stored secure email contents. Additionally, the email server typically creates a non-secure email using the addresses from the secure email and includes the transaction number as the contents of the non-secure email. Such a non-secure email is referred to herein as a cover email. The non-secure cover email is in the inboxes of all the addressees identified in the secure mail.

E-mails typically include a message and perhaps attachments. The message and attachments are generally known as the contents of the email. A user who creates and sends an email is referred to herein as an originator or a sender, a user who re-sends an email but did not create the email may also be referred to herein as a sender, and a user who receives an email is referred to herein as a recipient. Recipients may include users to whom the email is addressed as well as users copied on the email.

Figure 8:
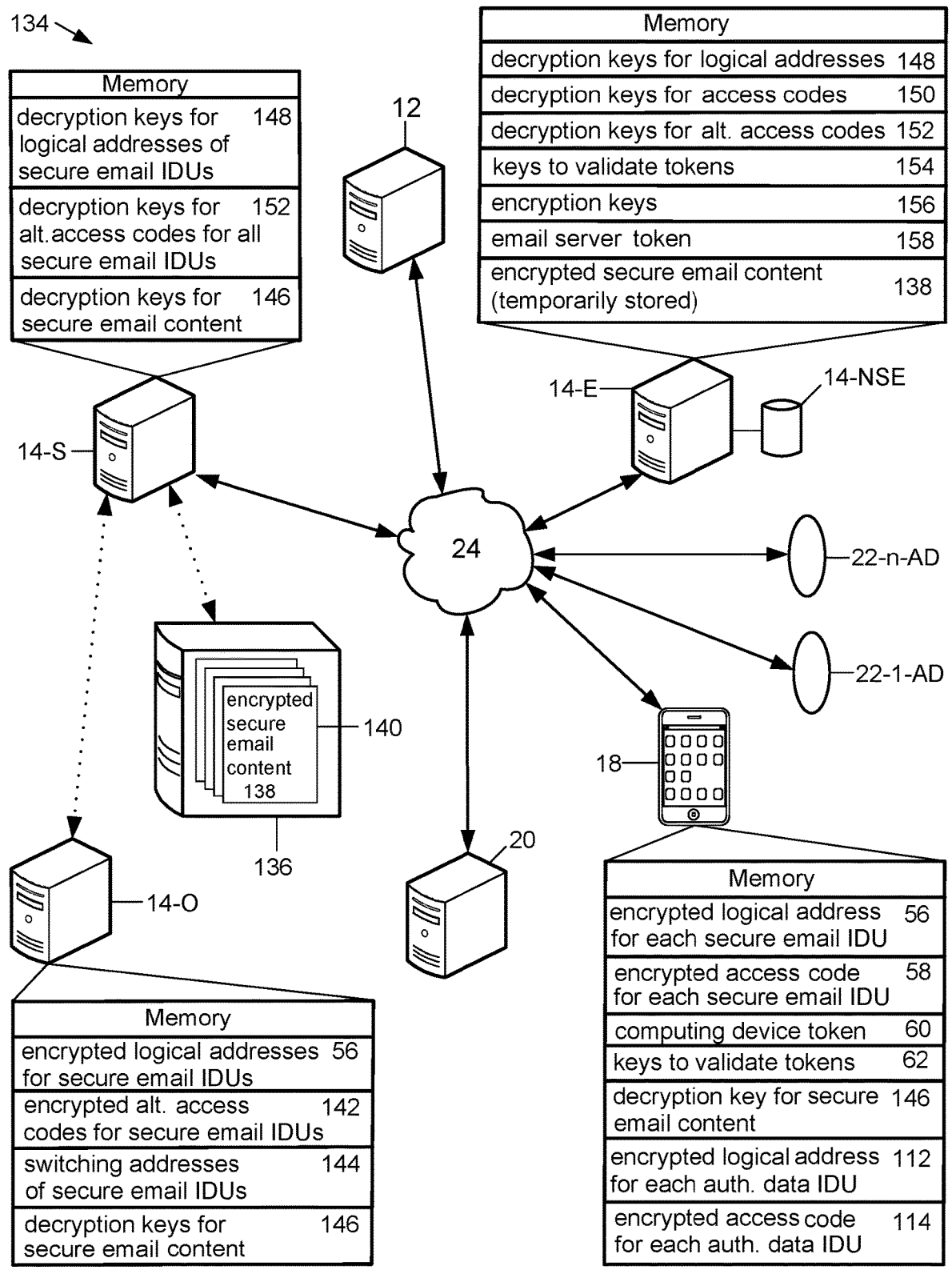
FIG. 8 is a diagram of an example secure email computer system for enhancing email security using individual data units while enabling e-discovery.

The example secure email computer system illustrated in FIG. 8 is similar to the IDMS illustrated in FIG. 6. As such, features illustrated in FIG. 8 that are identical to features illustrated in FIG. 6 are identified using the same reference numerals used in FIG. 6.

FIG. 8 is a diagram of an example secure email computer system 134 for enhancing email security using IDUs while enabling e-discovery processes. The example secure email (SE) computer system 134 includes an IDMS that can perform the same authentication functions as the IDMS 108 described herein with regard to FIG. 6. Additionally, the SE computer system 134 includes a hosted IDU platform 136, and the server 14 includes an offline e-discovery server 14-O, an e-discovery search server 14-S, and an email server 14-E. Although not included in the SE computer system 134, the external computer system 110 may also be included.

Each user is associated with one Secure Email IDU and one authentication data IDU. Each authentication data IDU stores reference authentication data of a respective user, and each Secure Email IDU stores encrypted secure email contents sent and received by a respective user. Storing both the sent and received encrypted secure email contents minimizes the number of users involved in any e-discovery process because none of the users who sent secure emails to a user of interest need be involved. Alternatively, the Secure Email IDU for each user may store the encrypted contents of sent emails only. The Secure Email IDUs and the authentication data IDUs may additionally store the same information described herein with regard to the example IDU 22-1. Although the reference authentication data and encrypted contents sent and received by a respective user are stored in separate IDUs in the example SE computer system 134, a single IDU may alternatively store both the reference authentication data and the encrypted email contents of a single user.

In order for the SE computer system 134 to support e-discovery, the Secure Email IDUs are not separate devices that can be physically managed by respective users in different locations associated with each respective user. Rather, the Secure Email IDUs are physically consolidated on one or more circuit boards 140 included in the hosted IDU platform 136. The circuit boards 140 constitute the hosted IDU platform 136 which is managed by the organizational entity responsible for compliance with e-discovery regulations. Each IDU is still a separate component within the system even though many IDUs are hosted on a single chip, circuit board, or physical device.

The Secure Email IDU of each user is not physically managed in a location associated with and controlled by the respective user because such an arrangement would not comply with the regulatory obligations for e-discovery. That is, any user who owns and manages his or her Secure Email IDU could avoid having incriminating emails discovered by simply destroying the emails on his or her Secure Email IDU. Thus, user-hosted Secure Email IDUs are not included in the computer system 134. Although one hosted IDU platform 136 managed by an organizational entity is included in the SE computer system 134, the SE computer system 134 may alternatively include any number of hosted IDU platforms 136 each of which may be in the same or different geographic location. The hosted IDU platforms 136 may be managed by the same or different organizational entities. It should be understood that if the SE computer system 134 is not used for e-discovery, the hosted IDU platform 136 need not be included in the SE computer system 134. Rather, Secure Email IDUs for system 134 could be implemented either using the hosted IDU platform 136 or separate IDUs that are physically managed by respective users in different locations associated with each respective user, or some combination of user managed and hosted IDUs.

The offline e-discovery server 14-O stores the encrypted logical address 56 for the Secure Email IDU of each user, an encrypted alternative access code 142 for the Secure Email IDU of each user, one or more switching addresses 144 of the Secure Email IDU for each user, and decryption keys 146 for decrypting the secure email content 138 of the Secure Email IDU of each respective user stored in the hosted IDU platform 136. Although the switching addresses 144 are not encrypted, the switching addresses 144 may alternatively be encrypted and the decryption keys 146 may be stored on one or more different servers, for example, the e-discovery search server 14-S.

The switching address 144 is intended to denote the information required by the manager of the hosted IDU platform 136 in order to switch a Secure Email IDU from using the access code 58 to the alternative access code 142. This may involve physically accessing the Secure Email IDU or electronically addressing a specific circuit board 140 containing multiple Secure Email IDUs using a dedicated network connection that is only accessible from a computer within a data facility. An example switching address 144 for manually accessing a Secure Email IDU to flip a physical switch may be rack 203, circuit board in slot 5 Of the rack, switch number 105 on the circuit board. An example of an electronic switching address 144, using IPv4 terminology, may be circuit board switching IP address 12.34.56.78.

Although the offline e-discovery server 14-O stores the encrypted logical addresses 56 and encrypted alternative access codes 142, the e-discovery server 14-O is not a centralized target susceptible to remote cyber-attack by virtue of being offline and thus not hackable from a remote location. Additionally, by virtue of the offline e-discovery server 14-O storing the encrypted alternative access codes 142 instead of the encrypted access codes 58 for the Secure Email IDUs, the SE computer system 134 is less vulnerable to attacks against the offline e-discovery server 14-O perpetuated by one or more individuals associated with the organizational entity that manages the hosted IDU platform 136. Specifically, stealing all the data on the offline e-discovery server 14-O will not enable an external cyber-criminal to hack into Secure Email IDUs because the Secure Email IDUs typically operate based on the access code 58 which is not stored on the offline e-discovery server 14-O. In addition, much of the data stored on the e-discovery server 14-O is encrypted and would require compromising multiple additional devices in the SE computer system 136 to access user data for more than a single user.

The dotted lines between the e-discovery search server 14-S and the offline e-discovery server 14-O and the hosted IDU platform 136 are intended to indicate that a direct electronic connection may be established between the servers 14-S and 14-O, and between the server 14-S and the hosted IDU platform 136. An electronic connection may be desirable because the administrative convenience of such a connection may outweigh the additional security afforded by remaining completely offline. Such an electronic connection could also avoid using any externally accessible network connections by plugging directly into the circuit boards of the hosted IDU platform 136. The electronic connection could be made only when needed so could be temporary, thus minimizing windows of increased vulnerability. Alternatively, the connection between the e-discovery search server 14-S and the offline e-discovery server 14-O may be an air gap which adds additional protection for the data stored in the offline e-discovery server 14-O.

Alternative access codes 142 are useful only when a Secure Email IDU is switched from using the access code 58 to the alternative access code 142. The switch to using the alternative access code 142 is temporary and requires physical access to the hosted IDU platform 136 as well as knowing the switching address 144 secured in the offline e-discovery server 14-O as well as the access code 58 stored on the computing device 18 associated with a user.

An organizational entity responsible for e-discovery compliance manages the offline e-discovery server 14-O and thus has control of a copy of the decryption keys 146 for secure email content 138 as well as the switching addresses 144, encrypted alternative access codes 142, and encrypted logical addresses 56 of the Secure Email IDUs. This same entity also manages the hosting of the Secure Email IDUs on the hosted IDU platform 136. Alternatively, the hosted IDU platform 136 could be managed by a different organizational entity or be in a different geographic location, albeit with some additional complications regarding any temporary electronic connections by the e-discovery search server 14-S to switch to alternative access codes 142.

The e-discovery search server 14-S includes an application that causes the e-discovery search server 14-S to conduct an e-discovery search process and an application that causes the e-discovery search server 14-S to obtain data from the offline e-discovery server 14-O when necessary. This is necessary to account for cases in which a recipient does not comply with an e-discovery request to release the encrypted logical address 56 and encrypted access code 58 for his or her Secure Email IDU. For example, this could occur due to being on vacation and not responding to emails during an e-discovery process. It could also occur if the recipient does not want his or her secure emails searched during an e-discovery process. The data for non-compliant recipients obtained from the offline e-discovery server 14-O may be temporarily stored in the e-discovery search server 14-S.

The e-discovery search application enables the search server 14-S to accept search parameters useful for defining the scope of an e-discovery search. Such search parameters include, but are not limited to, a list of specific users, dates, and keywords. Additionally, the search server 14-S stores the decryption keys 148 for encrypted logical addresses 56 of the Secure Email IDUs, the decryption keys 152 for the alternative access codes 142 for the Secure Email IDUs, and the decryption keys 146 for secure email content. The e-discovery search server 14-S is configured to securely communicate over the network 24

The servers 14-O, 14-S, and 14-E include subcomponents similar to the subcomponents described herein for the additional server 14. The offline e-discovery server 14-O, the e-discovery search server 14-S, and the email server 14-E may alternatively be any type of computing device, for example, a personal computer, capable of performing the functions described herein for these servers. The e-discovery search server 14-S may alternatively be included within the email server 14-E, but is shown separately as this enables strong protection of the data stored in the offline e-discovery server 14-O while still allowing a direct electronic connection with the offline e-discovery server 14-O.

The computing device 18 associated with each user stores the encrypted logical address 56 and the encrypted access code 58 for the Secure Email IDU of a respective user, as well as the computing device token 60 and keys 62. The computing device 18 of each user also stores the decryption key 146 for that user's secure email content, and an encrypted logical address 112 and an encrypted access code 114 for the authentication data IDU of the user associated with the computing device 18. It should be appreciated that the encrypted logical addresses 56 and the decryption keys 146 are also stored in the offline e-discovery server 14-O.

The email server 14-E also performs all user verifications for non-secure email functions. However, verification functions for accessing secure email content are performed by the authentication computer system 20. Separating the secure from the non-secure email verification functions imposes the least impact on day-to-day use of the non-secure email system while applying the highest security standards for secure emails. Alternatively, either the email server 14-E or the authentication computer system 20 may conduct all verification transactions.

The email server 14-E also performs the functions of the POS computer system 16 described in FIG. 1. As a result, the POS computer system 16 is not included in the SE computer system 134. The email server 14-E manages all non-secure email content and includes a storage unit 14-NSE, or equivalent, for storing all non-secure emails, including cover emails. The internal subcomponents of the central user data server 12 are not shown as they are the same as described herein with regard to FIG. 1.

The email server 14-E may store data such as, but not limited to, decryption keys 148 for decrypting encrypted logical addresses 56 of Secure Email IDUs included in the hosted IDU platform 136, decryption keys 150 for decrypting encrypted access codes 58 of Secure Email IDUs included in the hosted IDU platform 136, decryption keys 152 for decrypting encrypted alternative access codes 142 of Secure Email IDUs included in the hosted IDU platform 136, keys 154 to validate tokens from other computer systems, encryption keys 156 for encrypting email content 138 stored in the hosted IDU platform 136, and an email server token 158. The email server 14-E may also temporarily store encrypted secure email content 138 as part of transmitting or buffering secure emails within the SE computer system 134.

Figure 9:
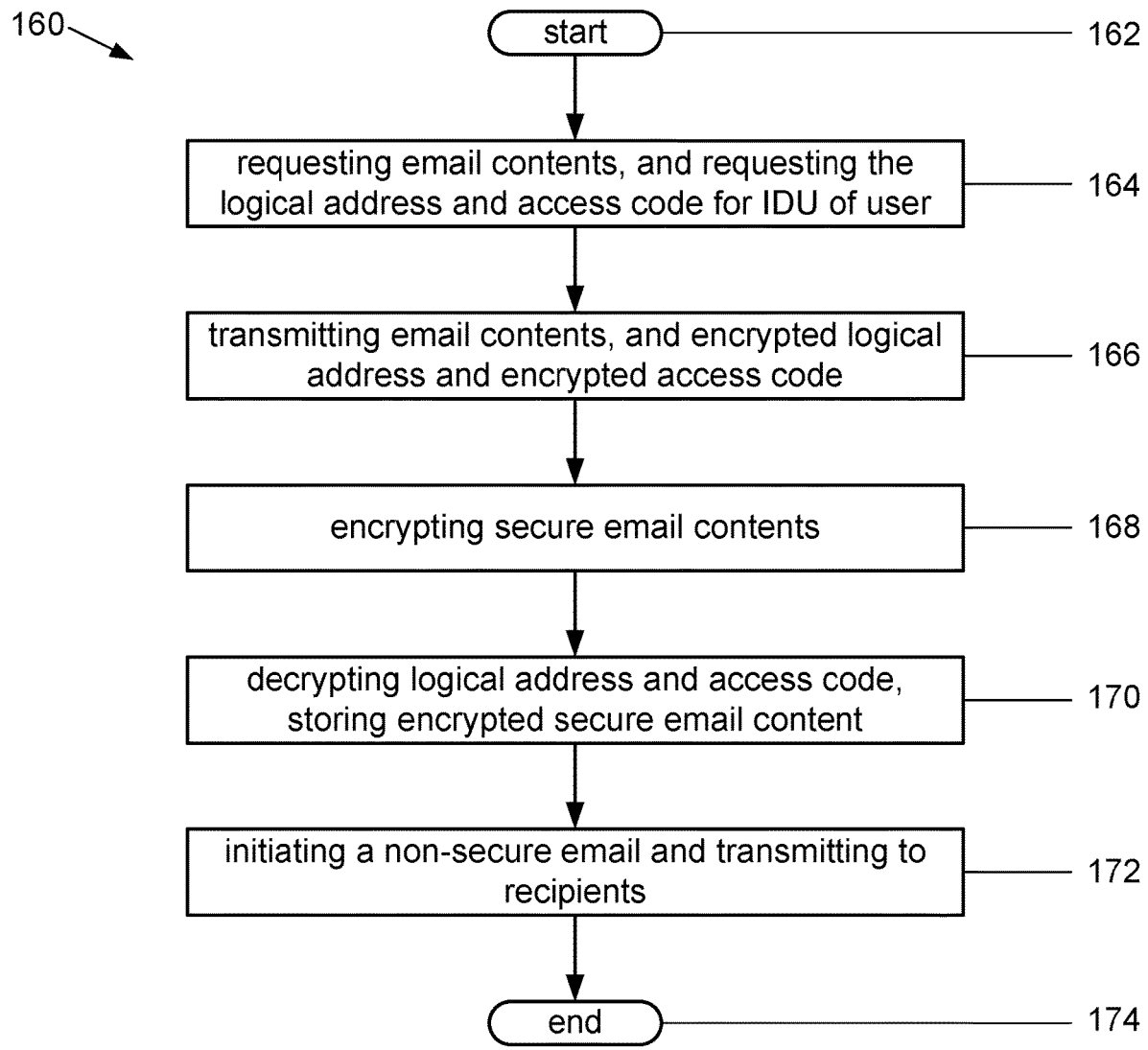
FIG. 9 is a flowchart illustrating an example method for transmitting a secure email within the example computer system shown in FIG. 8.

FIG. 9 is a flowchart 160 illustrating an example method for transmitting a secure email within the SE computer system 134. The method starts 162 after a sender initiates a secure email using his or her computing device 18 and is successfully verified as the result of a verification transaction conducted by the authentication computer system 20 as described herein with regard to FIG. 6. Alternatively, the email server 14-E may perform the verification transaction or the identity of the user may be verified in any other manner.

After the authentication computer system 20 sends a successful verification transaction result to the email server 14-E, the email server 14-E continues by requesting 164 the secure email contents from the computing device 18 of the sender, the encrypted logical address 56 of the Secure Email IDU of the sender, and the encrypted access code 58 of the Secure Email IDU of the sender. In response, the computing device 18 of the sender continues by transmitting 166 the secure email contents, the encrypted logical address 56, and the encrypted access code 58 to the email server 14-E.

After receiving the requested information, the email server 14-E continues by encrypting 168 the secure email contents for each recipient of the secure email as well as the sender using the encryption key 156 for each respective recipient and for the sender. The e-mail content is encrypted but the email addresses of the sender and recipients are not. The computing device 18 of the sender may collect additional information that is not encrypted and that is transmitted with the securely encrypted email contents. For example, a non-secure email subject line could be collected for display in the cover email displayed in the inbox of each recipient. Instead of a subject line that discloses sensitive information, such as "Travel Plans with Vladimir Putin in Russia", the non-secure subject line might be "Travel Plans." Alternatively, the sender and recipient email addresses may be encrypted albeit with some additional steps required during e-discovery.

Additionally, after receiving the requested information, the email server 14-E continues by decrypting 170 the encrypted logical address 56 and encrypted access code 58 of the sender and storing 170 the encrypted secure email content in the Secure Email IDU of the sender. The email server 14-E also creates separate encrypted copies of the secure email content for each recipient using the corresponding encryption key 156 of each respective recipient and temporarily stores the copies therein.

After storing 170 the secure email content, the email server 14-E continues by initiating 172 a non-secure cover email which includes the transaction number, and transmitting 172 the non-secure cover email to each intended recipient of the secure email. Doing so allows recipients to monitor the inbox of a single email system and be alerted when secure emails are available to be read. Next, processing ends 174.

The encrypted copies of the secure email content for each recipient may be temporarily stored in the email server 14-E until requested by a recipient. More specifically, when a recipient requests to read his or her copy of the secure email content, the email server 14-E requests the encrypted logical address 56 and encrypted access code 58 for the Secure Email IDU of the requesting recipient from the computing device 18 of the requesting recipient. After receiving the requested information from the computing device 18, the email server 14-E continues by decrypting 170 the received encrypted logical address 56 and encrypted access code 58, and using the decrypted logical address 56 and access code 58 to store 170 the copy of the secure encrypted email content in the Secure Email IDU of the requesting recipient. Next, the email server 14-E permanently deletes the temporary copy of the encrypted secure email for the requesting recipient. Thus, it should be understood that the recipient copies are temporarily stored in the email server 14-E.

Instead of storing the copy of the secure encrypted email in the email sever 14-E until the recipient attempts to read the secure email, the email server 14-E may immediately store the encrypted email contents in the Secure Email IDU of each recipient so long as there is a secure mechanism by which the email server 14-E can securely obtain the encrypted logical address 56 and encrypted access code 58 of the Secure Email IDU of each recipient. For example, the email server 14-E could send a text message or other notification to the computing device 18 of a recipient notifying the recipient of an incoming secure email. The recipient could then authorize release of his or her encrypted logical address 56 and encrypted access code 58 to enable immediately storing the secure email content in the Secure Email IDU of the recipient.

Although the example method of transmitting secure emails uses cover emails to notify recipients of received secure emails, any method of notifying recipients of secure emails may alternatively be used.

Figure 10:
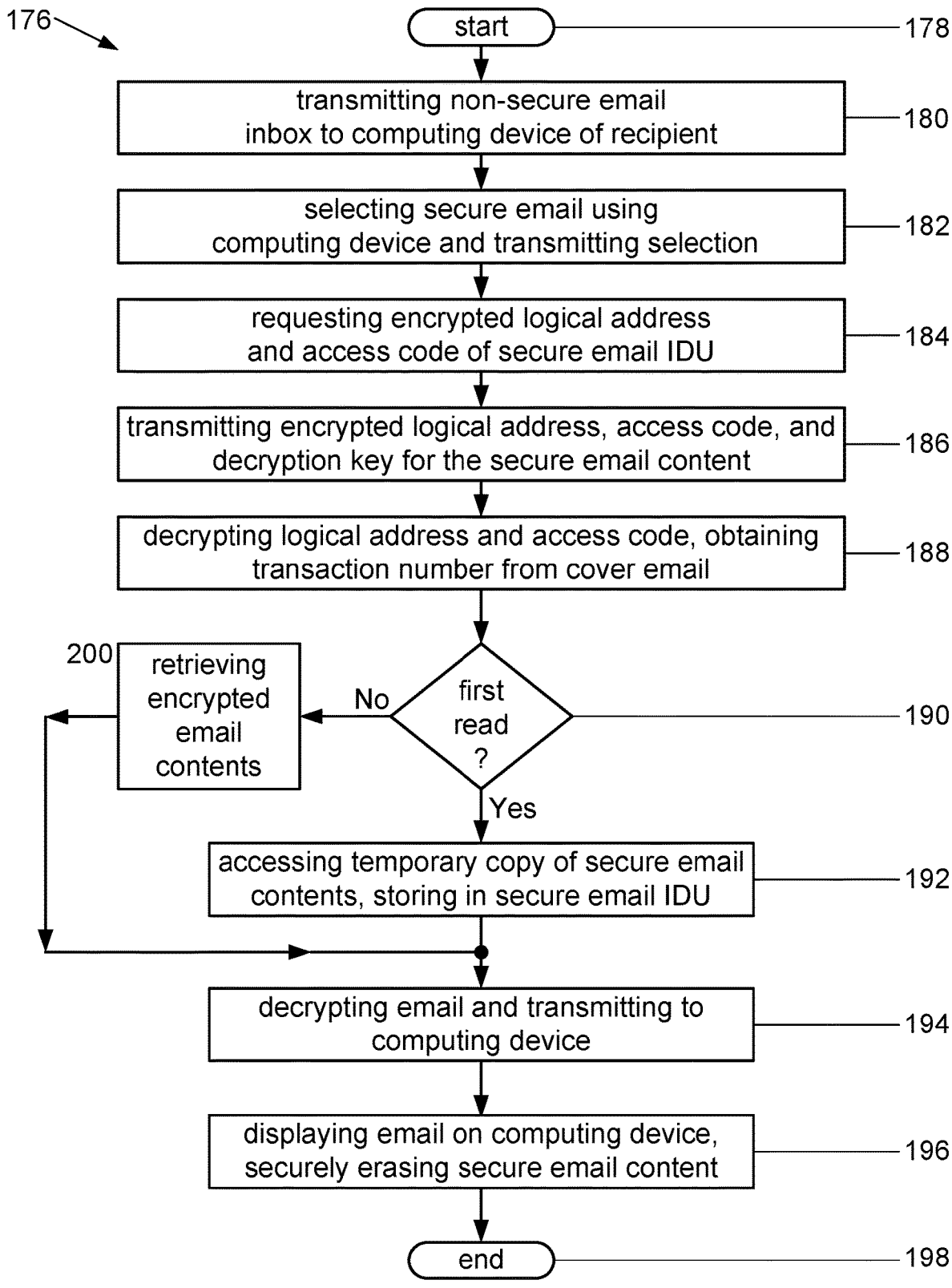
FIG. 10 is a flowchart illustrating an example method for receiving a secure email within the example computer system shown in FIG. 8.

FIG. 10 is a flowchart 176 illustrating an example method for receiving a secure email within the SE computer system 134. The method starts 178 when a recipient of a secure email attempts to access his or her email inbox using his or her computing device 18. The computing device 18 initiates a transaction with the email server 14-E to read the inbox, and the email server 14-E initiates a verification transaction. For each verification transaction recipients are verified to the same security level. However, in other example methods of receiving a secure email the level of verification may be tied to the security level of the email. The identity of the recipient may be verified using the method described herein for the IDMS 108 or in any other manner.

After the recipient is successfully verified, the email server 14-E continues by transmitting 180 to the computing device 18 of the recipient a non-secure email inbox for display, the recipient selects 182 an email to read from the displayed email inbox, and the computing device 18 continues by transmitting 182 the selection to the email server 14-E. In response, the email server 14-E continues by recognizing the selection as a request to read a secure email and requesting 184 from the computing device 18 of the recipient, the encrypted logical address 56 and encrypted access code 58 for the Secure Email IDU of the recipient, as well as the decryption key 146 of the secure email content of the recipient. Alternatively, the email server 14-E may request the decryption key 146 before or after requesting the encrypted logical address 56 and encrypted access code 58. Alternatively, the encrypted logical address 56, the encrypted access code 58 for the Secure Email IDU, and the decryption key 146 for the email contents may all be sent by the user computing device 18 at the same time as the selection of the secure email to be read.

Next, the computing device 18 of the recipient continues by transmitting 186 the encrypted logical address 56, encrypted access code 58, and decryption key 146 to the email server 14-E. In response, the email server 14-E continues by decrypting 188 the encrypted logical address 56 and encrypted access code 58 using the decryption keys 148, 150, respectively, obtaining 188 the transaction number from the cover email, and using the transaction number to identify the secure email contents corresponding to the selection.

Next, the email server 14-E continues by deciding 190 whether or not this is the first time the recipient requested to read the secure email contents of this specific email. If yes, the email server 14-E continues by accessing 192 the temporary copy of the encrypted secure email contents 138 stored therein using the transaction number, and storing 192 the encrypted email contents in the Secure Email IDU of the recipient using the decrypted logical address 56 and the decrypted access code 58 for the Secure Email IDU of the recipient. Next, the email server 14-E continues by decrypting 194 the secure email contents using the decryption key 146 of the recipient and securely transmitting 194 the decrypted secure email contents to the computing device 18 of the recipient. Alternatively, the email server 14-E may transmit the encrypted secure email contents to the computing device 18 of the recipient which decrypts the secure email contents.

Next, the computing device 18 continues by displaying 196 the secure email contents for the recipient to see. After the recipient reads the secure email content, the recipient causes the computing device 18 to transmit a message to the email sever 14-E indicating the secure email contents were read. In response, the email server 14-E continues by securely erasing 196 therefrom the temporary copy of the secure email contents. Next, processing ends 198.

If it is not the first time the recipient requested to read the secure email contents 190, the email server 14-E continues by retrieving 200 the encrypted secure email contents from the Secure Email IDU of the recipient using the transaction number with the decrypted logical address 56 and decrypted access code 58. Next, processing continues by conducting operations 194 and 196 as described herein and processing ends 198.

Some email systems are required to support e-discovery in the event of litigation involving the organizational entity using the email system.

Figure 11:
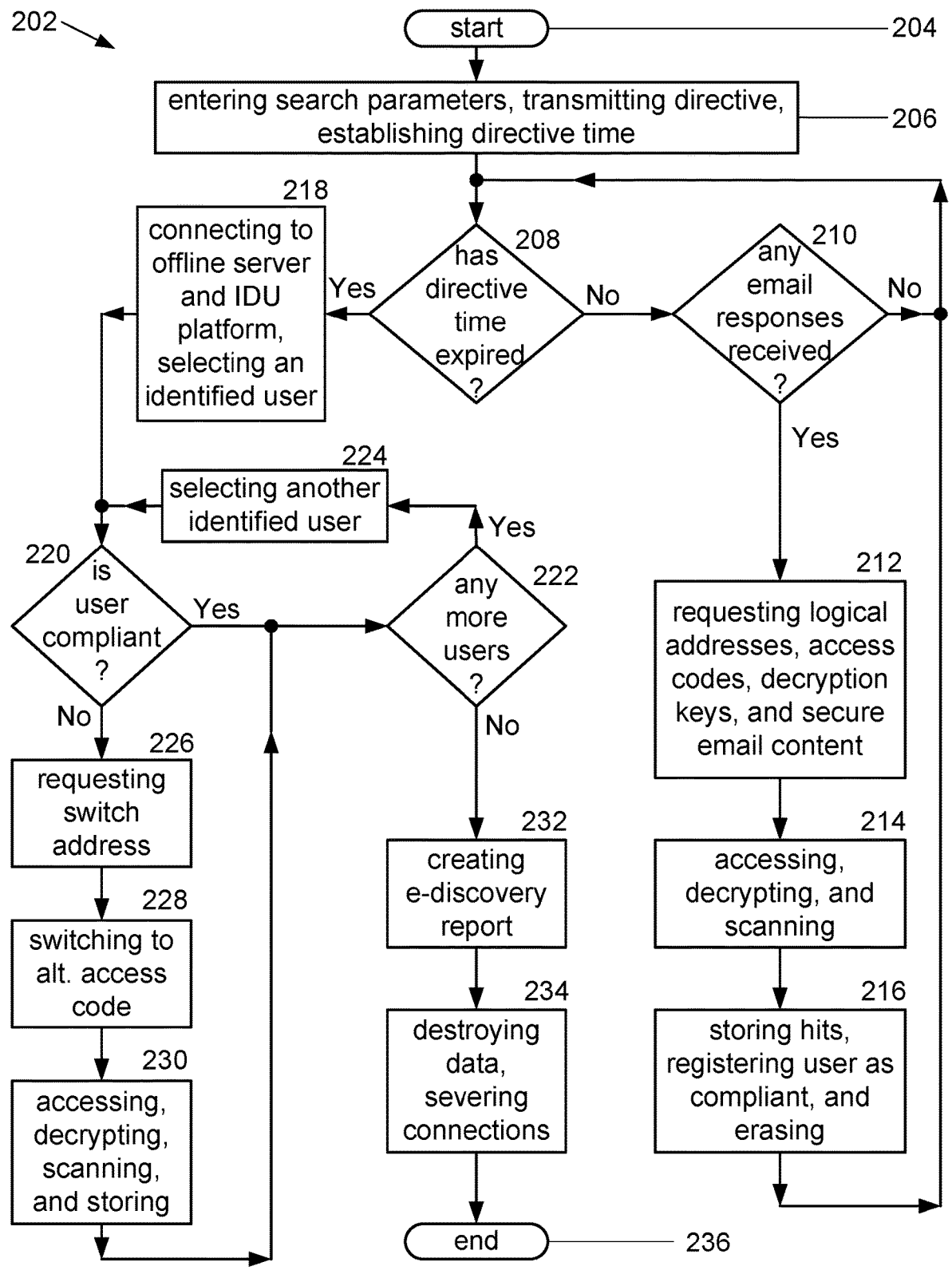
FIG. 11 is a flowchart illustrating an example method of conducting an e-discovery search within the example computer system shown in FIG. 8.

FIG. 11 is a flowchart 202 illustrating an example method for conducting an e-discovery search within the SE computer system 134. The method starts 204 with an e-discovery operator entering 206 e-discovery search parameters into the e-discovery search server 14-S. The e-discovery operator is a person associated with the organizational entity responsible for e-discovery. The e-discovery search parameters at least identify users included in the e-discovery search. After receiving the parameters, the e-discovery search server 14-S continues by securely transmitting 206 an e-discovery directive to the computing device 18 of each user identified in the search parameters. The directive requests each user to take actions that will facilitate e-discovery. At the time of transmission 206, the e-discovery search server 14-S also establishes 206 a period of time, referred to herein as a directive time, within which each user has to comply with the directive. Each identified user is considered noncompliant until complying with the directive. The directive time may be any period of time judged to facilitate complying with the legal requirements of discovery. For example, the directive time may range from five to ten days.

The directive is in the form of a secure email and instructs each identified user to release the encrypted logical address 56 and encrypted access code 58 for his or her Secure Email IDU, as well as the decryption key 146 for his or her secure email content. Each identified user complies with the directive by verifying his or her identity which may be done using the method described herein with regard to the IDMS 108 or in any other manner.

After successfully verifying his or her identity, the computing device 18 of a respective identified user receives the secure directive email and in response automatically releases and transmits the encrypted logical address 56, the encrypted access code 58, and the decryption key 146 in a secure email to the email server 14-E. The identified user may also be requested to take an explicit action before the encrypted logical address 56, the encrypted access code 58, and the decryption key 146 are released and transmitted. The encrypted logical address 56, the encrypted access code 58, and the decryption key 146 may alternatively be transmitted in any manner, for example, as a direct transmission between the computing device 18 of the identified user and the e-discovery search server 14-S. The directive may be authenticated in any other manner, for example, using Public Key Infrastructure (PKI) which supports signed transmissions that can be authenticated by the recipient.

Next, processing continues by deciding 208 whether or not the directive time has expired. If not, processing continues by determining 210 whether or not any secure emails have been received in response to the e-discovery directive. If not, the e-discovery search server 14-S continues by deciding 208 whether or not the directive time has expired. Otherwise, when secure email responses have been received 210, the e-discovery search server 14-S continues by requesting 212 from the email server 14-E, for each received email, the encrypted logical address 56, the encrypted access code 58, the decryption key 148 for the encrypted logical address 56, the decryption key 150 for the encrypted access code 58, and the encrypted secure email content.

After receiving the requested information from the email server 14-E, the e-discovery search server 14-S continues by accessing, decrypting, and scanning 214 the secure email contents of each identified user from whom a reply to the directive was received. Next, the e-discovery search server 14-S continues by storing 216 any scanned emails that satisfy the e-discovery search parameters and registering 216 the identified users as compliant. A scanned email that satisfies the search parameters is referred to herein as a hit. The e-discovery search processor 14-S also securely erases 216 all the data for each identified user from whom a reply was received, but the hits are not erased. The accessing, decrypting, scanning and erasing operations require little time so most of the information is retained by the e-discovery search server 14-S for only a short period of time, with only the hits retained until they are formatted and conveyed to the appropriate e-discovery manager.

Next, processing continues by deciding 208 whether or not the directive time has expired. Identified users may not comply with the directive before the directive time expires for many different reasons such as, but not limited to, losing his or her computing device 18, being sick or on vacation from work, or willfully obstructing the e-discovery process.

When the directive time has expired 208, the e-discovery search server 14-S continues processing by establishing 218 a temporary direct electronic connection with the hosted IDU platform 136 as well as the offline e-discovery server 14-O, selecting 218 an identified user, and determining 220 whether or not the identified user is registered as compliant. If the identified user is registered as compliant 220, the e-discovery search server 14-S continues by determining 222 whether or not any more identified users need to be evaluated for compliance. If so, processing continues by selecting 224 another identified user and determining 220 whether or not the identified user is registered as compliant.

When an identified user is not registered as compliant 220, the e-discovery search server 14-S continues by requesting 226 the switching address 144 of the Secure Email IDU of the identified user from the offline e-discovery server 14-O via the temporary electronic connection. Transferring the switching address 144 may alternatively be done manually to avoid connecting the offline e-discovery server 14-O to any other device. In response to the request, the offline e-discovery server 14-O continues by transmitting the switching address 144 of the identified user to the e-discovery search server 14-S.

After receiving the switching address 144, the e-discovery search server 14-S continues by decrypting the encrypted logical address 56 and alternative access code 142 of the identified user, and electronically switching 228 the Secure Email IDU of the identified user to use the decrypted alternative access code of the identified user. Next, the e-discovery search server 14-S continues by accessing 230 the Secure Email IDU of the identified user using the decrypted logical address 56, decrypted alternative access code, and decryption key 146 for secure email content of the identified user. Next, the e-discovery search server 14-S continues by decrypting 230 the secure emails of the identified user using the decryption key 146 of the identified user, scanning 230 the decrypted emails based on the e-discovery search parameters, and storing 230 the hits. Instead of storing 230 the hits electronically a printout may be generated that includes the hits. Alternatively, the hits may be put in any other form that an authorized person associated with the e-discovery would understand.

Next, processing continues by deciding 222 if there are any more identified users whose compliance was not evaluated at operation 220. If so, processing continues by selecting 224 another identified user and determining 220 whether or not the other identified user is registered as compliant. However, when there are no more identified users 222 to evaluate for compliance, the e-discovery search processor 14-S continues by creating 232 an e-discovery report based on the hits, destroying 234 data temporarily stored as part of the e-discovery process, and severing the temporary direct electronic connections with the offline e-discovery server 14-O and the hosted IDU platform 136. Next, processing ends 236.

In the example method of conducting an e-discovery search, the Secure Email IDU of each non-compliant identified user reverts to the access code 58 after a single request has been processed using the respective alternative access code 142. The alternative access code 142 can be factory installed in the IDU, or updateable as one of several optional basic functions the IDU is capable of performing. As an alternative to switching access codes for a single transaction, the switch could temporarily disable the need for any access code or could enable transferring the contents of a Secure Email IDU from the hosted IDU platform 136 to a portable storage device that plugs into the hosted IDU platform 136. Another alternative may require a facility operator (not shown) to manually switch the Secure Email IDU of an identified non-compliant identified user. Such an alternative eliminates the need for the temporary direct electronic connections.

Although the e-discovery search server 14-S establishes a direct electronic connection with the hosted IUD platform 136 and the offline e-discovery server 14-O to facilitate transferring the switching address 144, the switching addresses 144 may alternatively be manually transferred to avoid connecting the offline e-discovery server 14-O to any other device or computer system.

The security of Secure Email IDUs stored in the hosted IDU platform 136 during the example e-discovery search method is enhanced by the following factors: a) the logical addresses 56 stored in the offline e-discovery server 14-O are encrypted and the offline e-discovery server 14-O does not store the access codes 58; b) The alternate access codes 142 stored in the offline e-discovery server 14-O are encrypted. Also, switching a Secure Email IDU requires either physical access to the hosted IDU platform 136 or access to the temporary dedicated electronic connection, both of which require physical access to a highly protected data center; c) Alternate access codes 142 are used briefly and temporarily; and, d) E-discovery operations can be scheduled days in advance which facilitates maintaining an exceptionally small group of people with access to the e-discovery servers 14-O and 14-S. This minimizes the exposure to insider attacks. In addition, e-discovery operations could be implemented as two-person functions. That is, e-discovery operations could require two separate e-discovery managers to log in before gaining access to servers 14-S and 14-O.

The example method of conducting an e-discovery search maintains most of the security advantages of using IDUs while enabling organizations to comply with e-discovery regulations even when some recipients may desire to conceal questionable or perhaps criminal activity by withholding the release of the encrypted logical address 56 and access code 58 of his or her Secure Email IDU.

The example methods described herein may be conducted partly on the central user data server 12, any server included in the additional server 14, the POS computer system 16, the user computing device 18, the authentication computer system 20, and on other computing devices (not shown) and other computer systems (not shown) operable to communicate over the network 24. Moreover, the example methods described herein may be conducted entirely on the other computer systems (not shown) and other computing devices (not shown). Thus, it should be understood that the example methods may be conducted on many combinations of computers, computer systems (not shown), and computing devices (not shown).

The functions described herein as being performed by the central user data server 12 may alternatively be performed by other components of the computer systems described herein. For example, any server included in the additional server 14, the POS computer system 16, the user computing device 18, the authentication computer system 20, or other computer systems (not shown) and computing devices (not shown) may perform the functions described herein for the central user data server 12. Likewise, the functions described herein as being performed by the POS computer system 16, the user computing device 18, the authentication computer system 20, and any server included in the additional server 14 may be performed by any other component of the computer systems described herein. However, the IDUs are not generally capable of performing the functions described herein for any other component so the IDUs cannot perform these functions. Conversely, the other general purpose components of the system are not capable of performing the functions of the IDU with the same levels of security. There are specific functions, such as encryption of the logical address of an IDU and user data record 72 that could be delegated to IDUs to provide additional security protections by minimizing the number of computing devices that see this data in unencrypted form.

Data described herein as being managed by the central user data server 12, any server included in the additional server 14, the POS computer system 16, the user computing device 18, and the authentication computer system 20 may alternatively be stored in other components of the computer systems described herein, including computer systems (not shown) and computing devices (not shown) operable to communicate with the central user data server 12 over the network 24. Data may be partially stored on different components of the computer systems described herein. For example, the encrypted access code 58 may be divided into two encrypted files one of which is stored on the user computing device 18 and the other of which is stored on another component of a computer system described herein. Overall, the inclusion of at least one IDU per user in a computer system enables the distribution of data and keys such that security of user data is greatly enhanced. Although one or more specific distributions of data and keys that enhance security are described herein, there are other distributions that achieve similar results. There are also alternative distributions that offer different tradeoffs between added security, convenience, and other factors that are important in real world implementations.

Components as used herein is intended to refer to logically distinct computer devices that may be logical targets for cyber-criminals. Such components include, but are not limited to, the central user data server 12, the server 14, POS computer systems 16, computing devices 18, authentication computer systems 20, and individual data units 22-1 to 22-*n* including individual IDUs included within the hosted IDU platform 136. The server 14 includes the e-discovery search server 14-S, the email server 14-E, the storage unit 14-NSE, and the offline e-discovery server 14-O.

The example methods described herein may be implemented with many different numbers and organizations of computer components and subcomponent. Thus, the methods described herein are not limited to specific computer-executable instructions. Alternative example methods may include different computer-executable instructions or components having more or less functionality than described herein.

The example individual data unit described herein is a simple component specifically designed to perform a small number of functions. Such a simple design facilitates reducing design flaws of the individual data unit and the complexity of software required to cause the individual data unit to perform the functions. As a result, the individual data unit is facilitated to be less vulnerable to successful cyber-attacks versus general purpose computers and computing devices which in turn facilitates increasing the security of user data records stored in the individual data unit.

As described herein, the individual data unit is not a general purpose computer. However, as technology evolves, it might become possible to formally validate the designs and eliminate exploitable flaws in progressively more complex devices. Thus, while the individual data unit is described herein as not being a general purpose computer with respect to today's state of the art, it is conceivable that future technologies would allow an individual data unit to be built upon general purpose computer technology while still retaining the necessary characteristic of being far less expensive and far less vulnerable to cyber-attacks than the other components in the system.

One example computer system described herein includes a central user data server, a server, a point of service computer system, a computing device, an authentication computer system, and a plurality of individual data units that each store the data of one user in a respective data user record. The data unit of each respective user may be located at and operated from a geographic location associated with the respective user. Moreover, there may be a large number of users and associated individual data units included in the computer system. As a result, the individual data units, as well as the data stored therein, may be massively distributed. Such massive distribution to as many as millions of different locations is not practical without an IDU.

The components of the computer systems described herein securely communicate with each other over a network and the central user data server manages the data record of each user. By virtue of massively distributing the individual data units, the user data is decentralized and thus constitutes a less attractive target for cyber-criminals than a centralized database containing the data of all users. Additionally, the individual data units provide additional locations for storing data and keys which increases the number of successful cyber-attacks needed to steal any data stored in the computer system. As a result, security of user data as well as of the components of the computer system is facilitated to be enhanced in a cost effective and reliable manner.

An example method for updating a user data record is also disclosed. More specifically, after a user initiates a network-based transaction with his or her computing device, the computing device transmits to a POS computer system the encrypted logical address and encrypted access code for each individual data unit associated with the user. The POS computer system requests that an authentication computer system verify the identity of the user. Verification of the user implicitly authorizes the requesting user to conduct the network-based transaction. When the identity of the user is verified, the POS computer system retrieves the user data and conducts the network-based transaction. When the user changed any information stored in his or her user data record or if the network-based transaction included additional information that should be stored in the data record of the user, the data record of the user is updated.

When the user data record is to be updated, the POS computer system updates the data record of the user and requests that the updated user record be encrypted and stored. The central user data server encrypts the user data record and arranges to store the updated data record on the IDU associated with the user. As a result, the security of user data records is facilitated to be enhanced, and the time and costs associated with updating user data records are facilitated to be reduced.

An example method for authenticating a user is also disclosed. More specifically, in response to receiving a transaction request from the computing device of a user, an external computer system requests the authentication computer system to verify the identity of the user. The authentication computer system sends a capture request to the computing device of the user. In response, the computing device of the user prompts the user to capture live authentication data of his or her self which is transmitted to the authentication computer system with other information. The authentication computer system transmits the captured live authentication data and other information to the central user data server which obtains reference authentication data from the IDU of the user. After validating the reference authentication data, the central user data server transmits the captured live authentication data and reference authentication data to the authentication computer system which conducts a verification transaction based on the received data. As a result, accuracy and trustworthiness of authentication transaction results are facilitated to be enhanced, and the time and costs associated with conducting verification transactions are facilitated to be reduced.

An example method for transmitting a secure email is also disclosed. More specifically, a sender who initiates a secure email is successfully verified and the successful verification result is sent to an email server which requests secure email contents from the computing device of the sender and other information. In response, the computing device of the sender transmits the requested information to the email server. The email server decrypts the information and arranges to store the secure email contents in the Secure Email IDU of the sender. The email server also creates encrypted copies of the secure email content for each email recipient, initiates a non-secure cover email, and transmits the non-secure email to each intended recipient of the secure email. As a result, the security of secure emails is facilitated to be enhanced in a cost effective and reliable manner.

A method of receiving a secure email is also disclosed. More specifically, when a recipient of a secure email attempts to access his or her email inbox using his or her computing device, the computing device initiates a transaction with the email server to read the inbox, and the email server initiates a verification transaction. After the recipient is successfully verified, the email server continues by transmitting to the computing device of the recipient a non-secure email inbox for display. The recipient selects an email to read from the displayed email inbox, and the computing device transmits the selection to the email server. The email server obtains a transaction number from a cover email and uses the transaction number to identify the secure email contents corresponding to the selection.

If it is the first time the recipient requested to read the email, the email server accesses a temporary copy of the secure email contents stored therein using the transaction number and stores the encrypted email contents in the Secure Email IDU of the recipient. If it is not the first time, the email server retrieves the encrypted email contents from the Secure Email IDU of the recipient using the transaction number, and the email server securely transmits the secure email content to the computing device of the recipient. As a result, the security of email content is enhanced in a cost effective and reliable manner.

A method for conducting e-discovery is also disclosed. More specifically, after e-discovery search parameters are entered into an e-discovery search server, the e-discovery search server securely transmits an e-discovery directive to the computing device of each user identified in the search parameters. Responding to this directive releases the encrypted logical address and encrypted access code for that user's IDU where secure email content is stored. If the directive has not expired and secure email responses have been received in response to the directive, the e-discovery search server requests from the email server, for each received email, the encrypted secure email content. After receiving the requested information from the email server, the e-discovery search server accesses, decrypts, and scans the secure email contents of each identified user from whom a reply to the directive was received. Next, the e-discovery search server stores any scanned emails that satisfy the e-discovery search parameters and registers the identified users as compliant.

When the directive time has expired, the e-discovery search server establishes a temporary direct electronic connection with the hosted IUD platform as well as with the offline e-discovery server, selects an identified user, and determines whether or not the identified user is registered as compliant. When an identified user is not registered as compliant, the e-discovery search server continues by requesting the switching address of the Secure Email IDU of the identified user from the offline e-discovery server 14-O via the temporary electronic connection.

After receiving the switching address, the e-discovery search server continues by electronically switching the Secure Email IDU of the identified user to use the alternative access code of the identified user. Next, the e-discovery search server continues by accessing the Secure Email IDU of the identified user using the encrypted logical address, alternative access code, and decryption key for secure email content of the identified user.

When there are no more identified users to evaluate for compliance, the e-discovery search server continues by creating an e-discovery report based on the hits, destroying data temporarily stored as part of the e-discovery process, and severing the temporary direct electronic connections with the offline e-discovery server and the hosted IDU platform. As a result, an e-discovery process is made practical even while retaining most of the improved security enabled by distributing secure email contents and decryption keys for those contents to separate IDUs for each user.

The example methods described above should not be considered to imply a fixed order for performing the method steps. Rather, the method steps may be performed in any order that is practicable, including simultaneous performance of at least some steps. Moreover, the method steps may be performed in real time or in near real time. It should be understood that, for any process described herein, there can be additional, fewer, or alternative steps performed in similar or alternative orders, or in parallel, within the scope of the various embodiments, unless otherwise stated. Furthermore, the invention is not limited to the embodiments of the methods, systems and apparatus described above in detail. Rather, other variations of the methods, systems, and apparatus may be utilized within the spirit and scope of the claims.

What is claimed is:

1. An individual electronic data device for enhancing the security of user data records within a computer system comprising:
a processor; and
a memory configured to store user data records, encryption keys, decryption keys, and access codes associated with protecting user data records, said individual electronic data device being connectable to a network and said memory being in communication with said processor and having instructions stored thereon which, when read and executed by said processor, cause said individual electronic data device to perform at least the following functions:
receive user data records to be stored therein;
receive encryption keys to encrypt user data records;
encrypt user data records;
store encrypted user data records;
receive description keys to decrypt encrypted user data records;
retrieve and decrypt encrypted user data records; and
transmit decrypted user data records, wherein
said individual electronic data device is configured to communicate with different individual electronic data devices configured to perform the same functions as said individual electronic data device and with other computers within the computer system via the network,
the individual electronic data devices and computers are components in the computer system,
user data records encryption keys, decryption keys, and access codes can be stored amongst the individual electronic data devices and other components in the system, such that
i) each component in the system that stores user data records, encryption keys, decryption keys, and/or access codes requires a separate cyberattack to compromise the data stored on that respective component
ii) the compromise of at least M+1 separate components is required to compromise the data of a single user, where M is the number of individual electronic data devices used to store the data records of the user and associated encryption and decryption keys as well as any access codes, and
iii) the compromise of $\Sigma_{i=1 \ to \ N} (M_i+1)$ separate components in the system is required to compromise all the user data in the system, where N is the number of users and $M_i$ is the number of specialized electronic data units for each user in the system.

2. A computer system for enhancing the security of data records comprising:
a plurality of individual electronic data devices that communicate via a network and each store a portion of the data records, encryption keys, decryption keys, and access codes for each of a plurality of users; and
computers configured to communicate with the individual electronic data devices via the network and to store encryption keys, decryption keys, and access codes for accessing the user data records, wherein
the individual electronic data devices and computers are components in the computer system,
each component storing user data records, encryption keys, decryption keys, and/or access codes requires a separate cyberattack to compromise the data records stored therein,
the compromise of at least M+1 components is required to compromise the data of a user using M individual electronic data devices to store user data records, encryption keys, decryption keys, and/or access codes associated with the at least one data record of the user, and
the compromise of $\Sigma_{i=1 \ to \ N} (M_i+1)$ separate components is required to compromise the data records of each user, where N is the number of users and $M_i$ is the number of individual electronic data units for each user.

3. A method for enhancing the security of a computer system comprising:
storing data records of a user amongst a plurality of individual electronic data devices associated with the user; and
storing encryption keys, decryption keys, and access codes for accessing the user data records amongst a plurality of components, wherein the individual electronic data devices and computers are components in the computer system and each component requires a separate cyberattack to compromise the data stored therein such that the compromise of the data records for one user requires i) the successful compromise of at least M+1 components, where M is the number of individual electronic data devices associated with the user to store the data records of the user, and ii) the successful compromise of at least N×(M+1) components to compromise the data records of each user, where N is the number of users and M is the number of individual electronic data devices associated with each respective user.

4. A method for enhancing the security of a computer system in accordance with claim 3, wherein each user can choose a different number of individual electronic data devices to achieve different degrees of individual security, such that the compromise of the data for one user requires i) the successful compromise of at least M+1 components, where M is the number of individual electronic data devices associated with the user, and ii) the successful compromise of at least $\Sigma_{i=1 \ to \ N} (M_i+1)$ separate components to compromise the data of all users, where N is the number of users and $M_i$ is the number of individual electronic data devices associated with each respective user.

5. A method for enhancing the security of a computer system in accordance with claim 3, wherein each user may choose a different number of individual electronic data devices to redundantly store user data records, encryption keys, decryption keys, and access codes such that the reliability of successfully accessing that user's data records is improved.

* * * * *